(12) United States Patent
Ganigarakoppal Kantharaju et al.

(10) Patent No.: US 12,210,776 B1
(45) Date of Patent: Jan. 28, 2025

(54) DIRECT-ATTACHED STORAGE DEVICE SOFTWARE RAID CRASH DUMP SYSTEM

(71) Applicant: Dell Products L.P., Round Rock, TX (US)

(72) Inventors: Nikhith Ganigarakoppal Kantharaju, Hassan (IN); Abhijit Shashikant Mirajkar, Bangalore (IN); Ajay Sukumaran Nair Syamala Bai, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/227,920

(22) Filed: Jul. 29, 2023

(51) Int. Cl.
*G06F 3/06* (2006.01)

(52) U.S. Cl.
CPC .......... *G06F 3/0659* (2013.01); *G06F 3/0689* (2013.01); *G06F 3/0604* (2013.01)

(58) Field of Classification Search
CPC ..... G06F 3/0659; G06F 3/0689; G06F 3/0604
See application file for complete search history.

(56) References Cited

U.S. PATENT DOCUMENTS

| | | | |
|---|---|---|---|
| 9,870,162 B2 | 1/2018 | Kundu et al. | |
| 11,100,033 B1* | 8/2021 | Nelogal | G06F 3/0626 |
| 2017/0269857 A1* | 9/2017 | Kundu | G06F 3/0689 |
| 2019/0138407 A1* | 5/2019 | Mehra | G06F 11/2058 |
| 2023/0079183 A1* | 3/2023 | Bansal | G06F 3/0659 |
| | | | 711/154 |

* cited by examiner

*Primary Examiner* — Francisco A Grullon
(74) *Attorney, Agent, or Firm* — Joseph Mencher

(57) ABSTRACT

A direct-attached storage device software RAID crash dump system includes a chassis housing a software RAID subsystem coupled to physical storage devices, controller devices, and a hypervisor subsystem. The software RAID subsystem presents a primary controller device to the hypervisor subsystem as being connected to a logical storage device provided by the physical storage devices. When the software RAID subsystem receives a first crash dump command from the hypervisor subsystem directed to the primary controller device and identifying a crash dump logical storage subsystem in the logical storage device, it transmits a respective second crash dump command to each of a subset of the physical storage devices that provide the crash dump logical storage subsystem via a respective controller device that couple the software RAID subsystem to that physical storage device, confirms completion of the respective second crash dump commands, and transmits a crash dump confirmation to the hypervisor subsystem.

20 Claims, 22 Drawing Sheets

DIRECT-ATTACHED STORAGE DEVICE SOFTWARE RAID CRASH DUMP SYSTEM

CROSS-REFERENCE TO RELATED APPLICATIONS

The present application is related to the following co-pending applications: (1) U.S. patent application Ser. No. 18/227,914, filed Jul. 29, 2023; and (2) U.S. patent application Ser. No. 18/227,926, filed Jul. 29, 2023.

BACKGROUND

The present disclosure relates generally to information handling systems, and more particularly to providing for crash dumps in a software Redundant Array of Independent Disk (RAID) that uses direct-attached storage devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, sometimes include hypervisors that utilize hardware resources in the server device to provide virtual machines. As will be appreciated by one of skill in the art in possession of the present disclosure, the virtual machines discussed above use connected storage devices to store their data, and the protection of such data in the event of the unavailability of any of those storage devices is desirable. An option for protecting data stored on storage devices like those described above includes the utilization of Redundant Array of Independent Disk (RAID) techniques, which one of skill in the art in possession of the present disclosure will recognize is a data storage virtualization technology that combines multiple physical storage devices into one or more logical storage devices for the purposes of data redundancy, performance improvements, and/or other RAID benefits that would be apparent to one of skill in the art in possession of the present disclosure. However, the utilization of RAID techniques on data stored by virtual machines in a server device can raise some issues.

For example, the VMWARE®n ESXi hypervisor available from VMWARE® Inc. of Palo Alto, California, United States, utilizes a software-defined virtual Storage Area Network (vSAN) data protection solution that protects data from storage device unavailability discussed above by aggregating storage devices connected to multiple server/host devices via the RAID techniques discussed above, and creating a shared datastore from pools of storage devices that may be accessed by each of the server devices/hosts that are part of a vSAN cluster. However, such vSAN data protection solutions require multiple server devices/hosts (e.g., a minimum of three server devices/hosts are required to provide level 1 RAID (RAID1) data protection, with one acting as a witness and the other two storing data), maintain multiple data backup copies, and are associated with relatively high licensing costs. As such, when the VMWARE®n ESXi hypervisor is utilized with a single server device/host to provide virtual machines that store their data in direct-attached storage devices included in the server device, the vSAN data protection solutions discussed above cannot be used to protect that data. One solution to such issues is the provisioning of a hardware-based RAID data protection solution in the server device that implements hardware-based RAID data protection techniques on data stored by the virtual machines in the storage devices in the server device, but such hardware-based RAID data protection solutions are relatively expensive.

Another solution to such issues is the use of a software RAID data protection solution in the server device like that provided in the Virtual RAID on Central Processing Unit (CPU) (VROC) data protection solution available in CPUs provided by INTEL® corporation of Santa Clara, California, United States. However, the VROC data protection solution discussed above is relatively limited in that it is only provided with INTEL® CPUs, may only be utilized with Non-Volatile Memory express (NVMe) storage devices, only provides RAID1 data protection, and requires Volume Management Device (VMD) hardware in the CPU. As such, the VROC data protection solutions discussed above do not operate with some types of storage devices (e.g., Serial Attached Small Computer System Interface (SCSI) (SAS) storage devices, Serial AT Attachment (SATA) storage devices, etc.) or some types of CPUs (e.g., CPUs available from Advance Micro Devices (AMD) of Santa Clara, California, United States). Furthermore, the VROC data protection solutions discussed above are also associated with relatively high licensing costs.

The inventors of the present disclosure have developed a direct-attached storage device software RAID system that allows software RAIDs to be provided using any types of direct-attached storage devices and any types of CPUs in a computing device, and that direct-attached storage device software RAID system is described in U.S. patent application Ser. No. 18/227,914, filed Jul. 29, 2023, the disclosure of which is incorporated herein by reference in its entirety. As described in that patent document, that direct-attached storage device software RAID system includes a software RAID subsystem that presents a single, primary controller device to a hypervisor subsystem as being connected to a logical storage device provided by a plurality of physical storage devices, receives commands from the hypervisor subsystem that are directed to the primary controller device and that identify a logical storage subsystem that is included in the logical storage device, and transmits those commands to a subset of the physical storage devices that provide that logical storage subsystem via respective controller device(s) that couple the software RAID subsystem to that subset of physical storage devices. However, the inventors of the present disclosure have recognized that the presentation to the hypervisor subsystem of the single, primary controller device as described above raises some issues with the operation of the direct-attached storage device software RAID system.

For example, many operating systems in server devices include "crash dump" functionality that, in response to a "crash", fault, unavailability, or other system issue in the server device, perform crash dump operations that include automatically generating crash dump information related to that system issue (e.g., the processes, drivers, programs, applications, and/or other components running or otherwise operating at the time of the system issue, the Kernel-mode stack that "stopped" or otherwise became unavailable, etc.), storing that crash dump information in a crash dump storage location, and subsequently providing access to that crash dump information in the crash dump storage location to help troubleshoot the cause of the system issue.

However, in server devices providing the direct-attached storage device software RAID system discussed above, the hypervisor subsystem may initiate the conventional crash dump operations described above to generate and store crash dump information in a crash dump storage location provided by a logical storage subsystem (e.g., a RAID crash dump Logical Unit Number (LUN) or other RAID crash dump volume) that is provided by the software RAID subsystem using multiple physical storage devices, and conventional crash dump functionality is not available for both "spanned" logical storage subsystems in the logical storage device (e.g., a RAID crash dump LUN or other RAID crash dump volume provided using physical storage devices connected to two or more controller devices) and "non-spanned" logical storage subsystems in the logical storage device (e.g., a RAID crash dump LUN or other RAID crash dump volume provided using physical storage devices connected to the same controller device). Furthermore, during conventional crash dump operations, the software RAID subsystem will only have access to the primary controller device (which is presented as being connected to the logical storage device), and will not be able to access any secondary controller device(s) that are connected to physical storage device(s) that provide the logical storage subsystem that will store the crash dump information, which will cause those conventional crash dump operations to fail. As will be appreciated by one of skill in the art in possession of the present disclosure, the enablement of crash dump functionality may be required for many hypervisor subsystems (including the VMWARE® ESXi hypervisor discussed above).

Accordingly, it would be desirable to provide a direct-attached storage device software RAID crash dump system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a software Redundant Array of Independent Disk (RAID) engine that is configured to: present, to a hypervisor subsystem, a first controller device included in a plurality of controller devices as a primary controller device that is connected to a logical storage device provided by a plurality of physical storage devices; receive, from the hypervisor subsystem, a first crash dump command that is directed to the primary controller device and that identifies a crash dump logical storage subsystem in the logical storage device; transmit, to each of a subset of the plurality of physical storage devices that provide the crash dump logical storage subsystem, a respective second crash dump command via a respective one of the plurality of controller devices that couples the processing system to that physical storage device; and confirm, with each of the subset of the plurality of physical storage devices that provide the crash dump logical storage subsystem, completion of the respective second crash dump command via the respective one of the plurality of controller devices that couples the processing system to that physical storage device and, in response, transmit a crash dump confirmation to the hypervisor subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
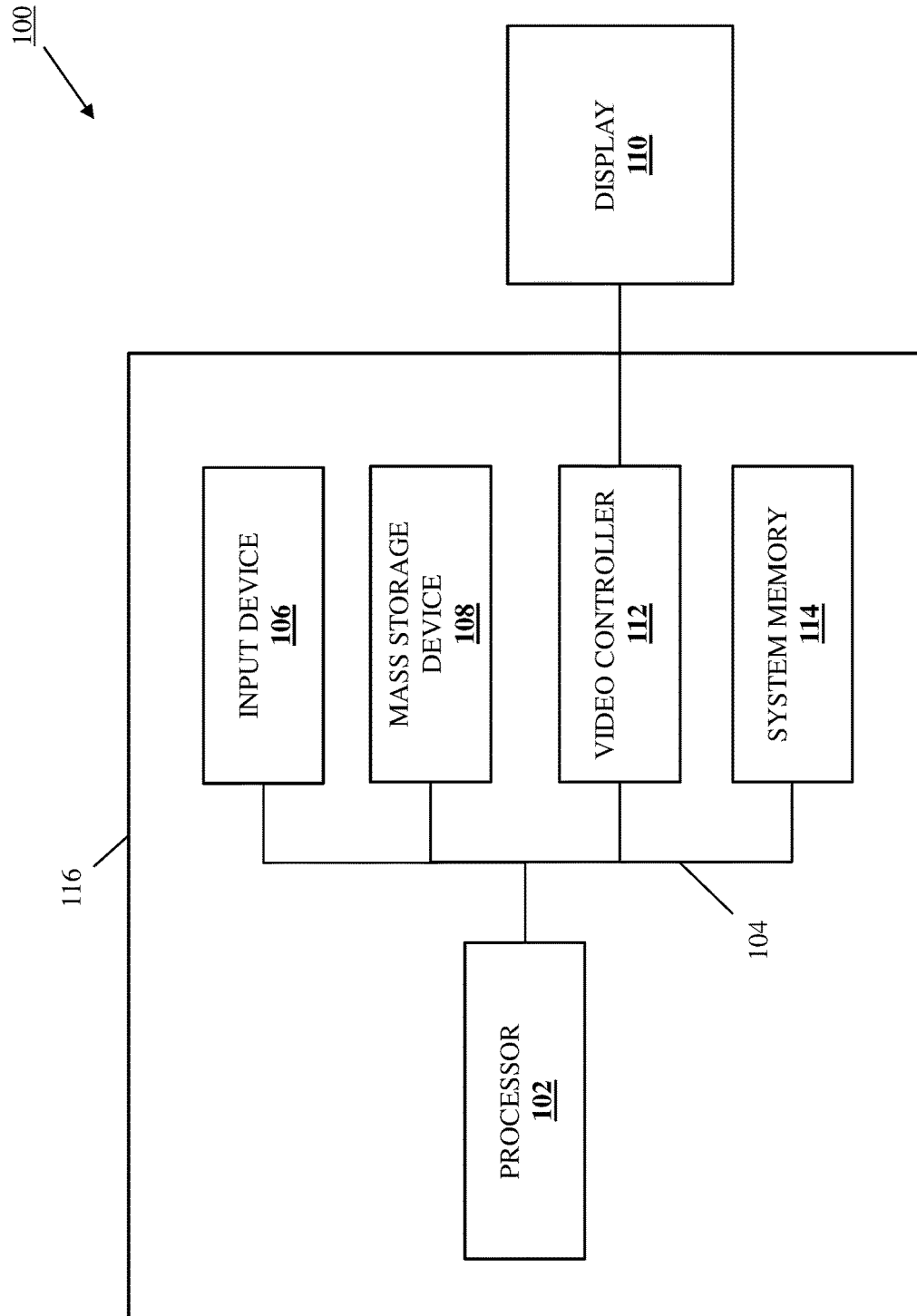
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
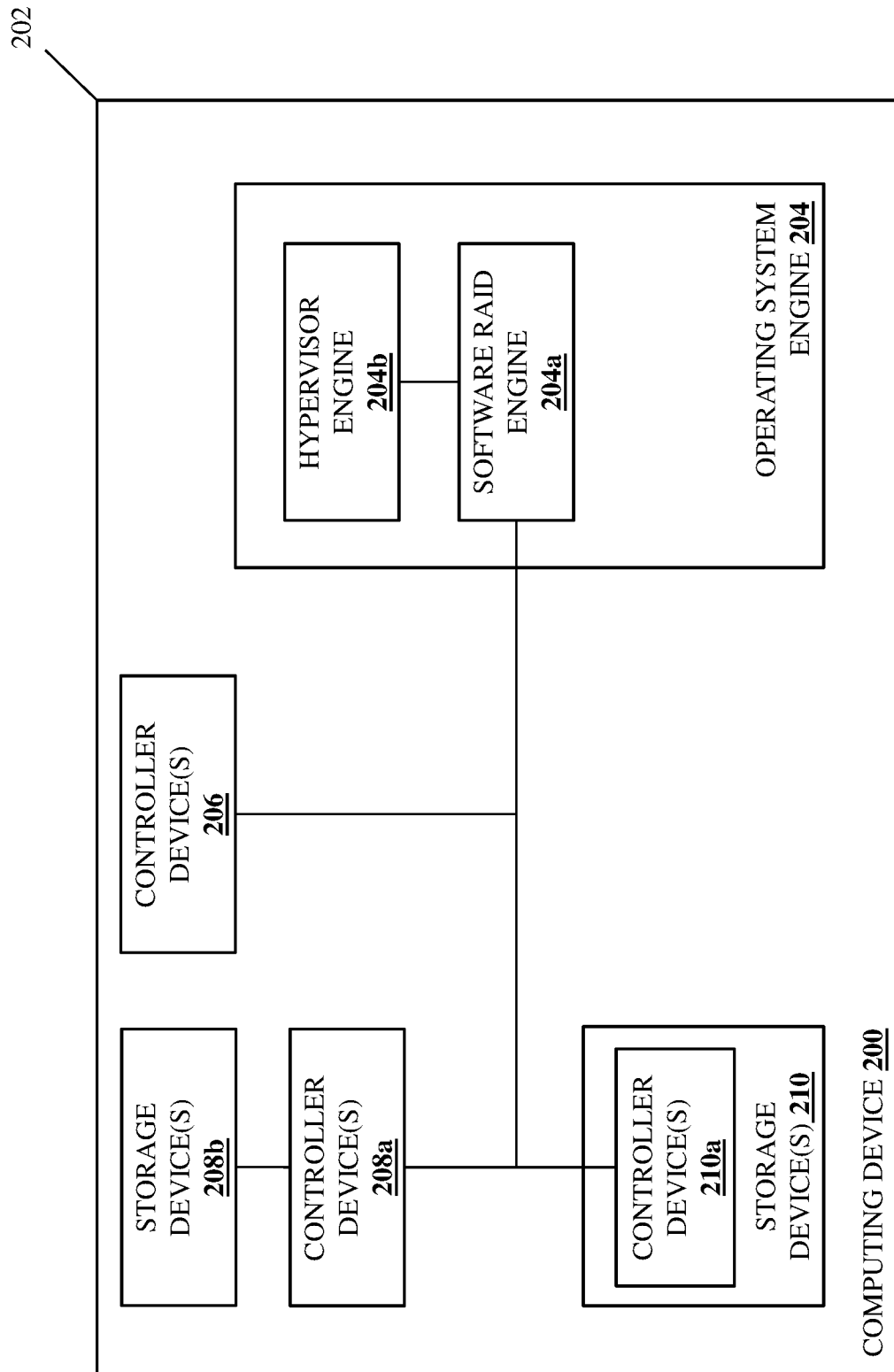
FIG. 2 is a schematic view illustrating an embodiment of a computing device that may include the direct-attached storage device software RAID system of the present disclosure.

Referring now to FIG. 2, an embodiment of a computing device 200 is illustrated that may include the direct-attached storage device software RAID system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated and described below.

For example, the chassis 202 may house a processing system (not illustrated, but which may include the processor 102 discussed above with reference to FIG. 1 such as a Central Processing Unit (CPU)) and a memory system (not illustrated, but which may include the memory 114 discussed above with reference to FIG. 1 such as Dynamic Random Access Memory (DRAM)) that is coupled to the processing system and that includes instructions that, when executed by the processing system, cause the processing system to provide an operating system engine 204 that is configured to provide an operating system and/or otherwise perform the functionality of the operating system engines, and/or computing devices discussed below. In the illustrated embodiment, the memory system may also include instructions that, when executed by the processing system, cause the processing system to provide a software RAID engine 204a that is configured to perform the functionality of the software RAID engines, software RAID subsystems, and/or computing devices discussed below.

To provide a specific example, the software RAID engine 204a may include a software RAID driver that is configured to utilize hardware resources in the computing device (e.g., the CPU, memory, etc.) in order to create and manage RAID infrastructure and/or perform any of a variety of RAID operations known in the art without the need for dedicated/specialized RAID hardware (e.g., a dedicated hardware RAID controller). However, while the software RAID engine 204a is illustrated and described as being included in the operating system and/or otherwise being provided by the operating system engine 204 (i.e., being provided by the processing/memory system combination that also provides the operating system engine 204), one of skill in the art in possession of the present disclosure will appreciate how the software RAID engine 204a may be provided separately from the operating system/operating system engine 204 while remaining within the scope of the present disclosure as well.

In an embodiment, the software RAID driver in the software RAID engine 204a will include a Small Computer System Interface (SCSI)-based driver, and one of skill in the art in possession of the present disclosure will appreciate how such a SCSI-compliant driver may be configured to be utilized with any PCIe devices/PCIe controller devices (e.g., Advanced Host Controller Interface (AHCI) controllers, SAS controllers, virtual PCIe controllers, NVMe controllers, etc.), thus allowing a computing device manufacturer to provide a single SCSI-based software RAID driver on a plurality of different computing device configurations of computing devices manufactured by the computing device manufacturer in order to enable the software RAID functionality described below in any of those computing devices using the PCIe devices/PCIe controller devices included in those computing devices. To provide a specific example, the software RAID driver in the software RAID engine 204a may be implemented using the native model of the VMWARE®n ESXi hypervisor available from VMWARE® Inc. of Palo Alto, California, United States, although other software RAID driver configurations will fall within the scope of the present disclosure as well.

In the illustrated embodiment, the memory system may also include instructions that, when executed by the processing system, cause the processing system to provide a hypervisor engine 204b that is configured to create and provide the virtual machines described below using the hardware resources in the computing device 200, and/or perform any of the other functionality of the hypervisor engines, hypervisor subsystems, and/or computing devices discussed below. For example, the hypervisor engine 204b may be configured to provide a VMWARE®n ESXi hypervisor available from VMWARE® Inc. of Palo Alto, California, United States, although other hypervisors are envisioned as falling within the scope of the present disclosure as well. As such, the hypervisor engine 204b may include a VMKernal that is available in the VMWARE®n ESXi hypervisor discussed above and that may provide any of the functionality of the hypervisor engine 204b described below. However, while the hypervisor engine 204b is illustrated and described as being included in the operating system and/or otherwise being provided by the operating system engine 204 (i.e., being provided by the processing/memory system combination that also provides the operating system engine 204), one of skill in the art in possession of the present disclosure will appreciate how the hypervisor engine 204b may be provided separately from the operating system/operating system engine 204 while remaining within the scope of the present disclosure as well.

In the illustrated embodiment, the chassis 202 also houses one or more controller devices 206 that are coupled to the software RAID engine 204a (e.g., via a coupling between the controller device(s) 206 and the processing system that provides the software RAID engine 204a). As discussed in the specific examples provided below, the controller device(s) 206 may be provided by Peripheral Component Interconnect express (PCIe) controller devices that may be included in and/or coupled to PCIe devices that are not provided by storage devices. For example, the PCIe controller device(s) 206 may be physical or virtual PCIe controller devices and may be included in Host Bus Adapter (HBA) devices, Advanced Host Controller Interface (AHCI) devices, and/or other PCIe devices that would be apparent to one of skill in the art in possession of the present disclosure. However, while illustrated and described as being provided by PCIe controller device(s), one of skill in the art in possession of the present disclosure will appreciate how the controller device(s) 206 may be provided by other types of controller devices while remaining within the scope of the present disclosure as well.

In the illustrated embodiment, the chassis 202 also houses one or more controller devices 208a that are coupled to the software RAID engine 204a (e.g., via a coupling between the controller device(s) 208a and the processing system that provides the software RAID engine 204a). As illustrated and discussed in the specific examples provided below, the controller device(s) 208a may be provided by Peripheral Component Interconnect express (PCIe) storage controller devices that are coupled to one or more storage devices 208b that may be provided by any of Non-Volatile Memory express (NVMe) storage devices, Serial Attached Small Computer System Interface (SCSI) (SAS) storage device, Serial AT Attachment (SATA) storage devices, and/or other storage devices that would be apparent to one of skill in the art in possession of the present disclosure. For example, the PCIe storage controller device(s) 208a may be provided by physical or virtual PCIe storage controller devices and may include PCIe storage controller devices configured as NVMe storage controllers, SAS storage controllers, SATA storage controllers, and/or other PCIe storage controller devices that would be apparent to one of skill in the art in possession of the present disclosure. However, while illustrated and described as being provided by PCIe controller device(s), one of skill in the art in possession of the present disclosure will appreciate how the controller device(s) 208a may be provided by other types of controller devices while remaining within the scope of the present disclosure as well.

In the illustrated embodiment, the chassis 202 also houses one or more controller devices 210a that are coupled to the software RAID engine 204a (e.g., via a coupling between the controller device(s) 208a and the processing system that provides the software RAID engine 204a). As illustrated and discussed in the specific examples provided below, the controller device(s) 210a may be provided by Peripheral Component Interconnect express (PCIe) controller devices that are included in one or more storage devices 210 that may be provided by any of Non-Volatile Memory express (NVMe) storage devices, Serial Attached Small Computer System Interface (SCSI) (SAS) storage device, Serial AT Attachment (SATA) storage devices, and/or other storage devices that would be apparent to one of skill in the art in possession of the present disclosure. For example, the PCIe storage controller device(s) 210a may be provided by physical or virtual PCIe storage controller devices and may include PCIe storage controller devices configured as NVMe storage controllers. However, while illustrated and described as being provided by PCIe controller device(s), one of skill in the art in possession of the present disclosure will appreciate how the controller device(s) 210a may be provided by other types of controller devices while remaining within the scope of the present disclosure as well.

However, while three different embodiments of controller devices 206, 208a, and 210a are illustrated and described as being included in the computing device 200 (e.g., stand-alone controller device(s), storage-device-connected controller device(s), and storage-device-integrated controller device(s)), one of skill in the art in possession of the present disclosure will appreciate how one or more of the controller devices 206, 208a, and/or 210a may be omitted from the computing device 200 while remaining within the scope of the present disclosure as well. Furthermore, while not explicitly illustrated, one of skill in the art in possession of the present disclosure will appreciate how any of the controller devices 208a and/or 210a may be coupled to and/or may control multiple storage devices 208b and/or 210, respectively, while remaining within the scope of the present disclosure as well.

Further still, one of skill in the art in possession of the present disclosure will appreciate how storage devices may be coupled to the software RAID engine 204a via multiple controller devices (e.g., when an NVMe storage device with an integrated controller device is connected via an external controller device to the software RAID engine 204a). As such, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the direct-attached storage device software RAID functionality discussed below, while remaining within the scope of the present disclosure as well.

For example, one of skill in the art in possession of the present disclosure will appreciate how the present disclosure describes the direct-attached storage device software RAID system of the present disclosure implemented to operate with hypervisor subsystem such as the VMWARE® ESXi hypervisor subsystem described above. However, the inventors of the present disclosure have also developed a direct-attached storage device software RAID system may be implemented with an operating system (i.e., rather than a hypervisor subsystem) in order to allow software RAIDs to be provided using any types of direct-attached storage devices and any types of CPUs in a computing device similarly as described below, and that direct-attached storage device software RAID system is described in U.S. patent application Ser. No. 18/228,006, filed Jul. 31, 2023, the disclosure of which is incorporated herein by reference in its entirety.

Figure 3:
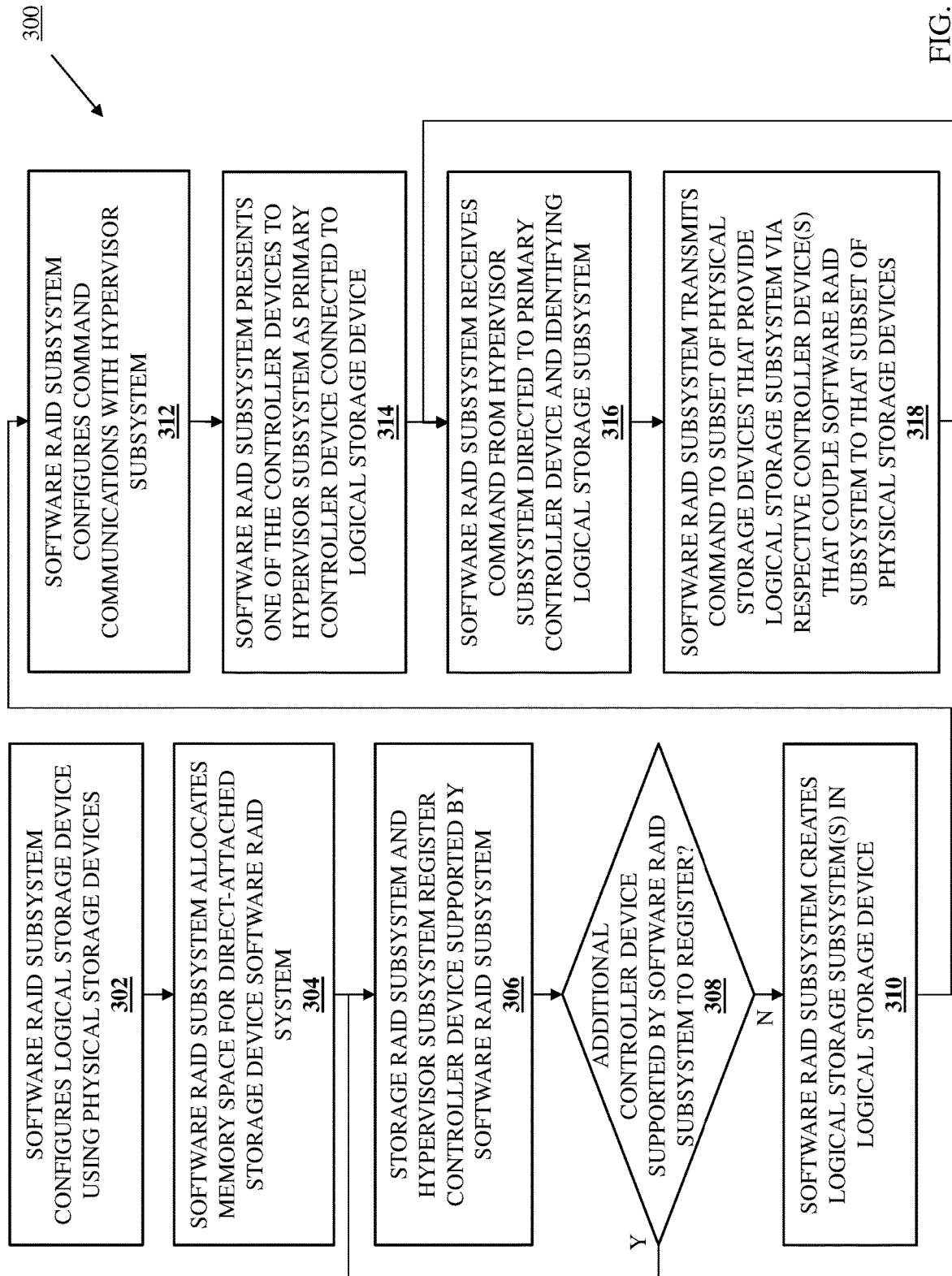
FIG. 3 is a flow chart illustrating an embodiment of a method for providing a software RAID using direct-attached storage devices in a computing device.

Referring now to FIG. 3, an embodiment of a method 300 for providing a software Redundant Array of Independent Disk (RAID) using direct-attached storage devices in a computing device is illustrated. As discussed below, the systems and methods of the present disclosure provide for the presentation by a software RAID subsystem to a hypervisor subsystem of a single, primary controller device as being connected to a logical storage device provided by a plurality of physical storage devices, with the software RAID subsystem receiving commands from the hypervisor subsystem that are directed to the primary controller device and that identify a logical storage subsystem that is included in the logical storage device, and transmitting those commands to a subset of the physical storage devices that provide that logical storage subsystem via respective controller device(s) that couple the software RAID subsystem to that subset of physical storage devices.

For example, the direct-attached storage device software RAID system of the present disclosure may include a chassis housing a software RAID subsystem coupled to physical storage devices, controller devices, and a hypervisor subsystem housed in the chassis. The software RAID subsystem uses the physical storage devices to provide a logical storage device to the hypervisor subsystem. The software RAID subsystem also presents a first controller device to the hypervisor subsystem as a primary controller device that is connected to the logical storage device. When the software RAID subsystem receives a command from the hypervisor subsystem directed to the primary controller device and identifying a logical storage subsystem in the logical storage device, it transmits the command to each of a subset of the physical storage devices that provide the logical storage subsystem in the logical storage device via a respective one of the controller devices that couples the software RAID subsystem to that physical storage device. As such, software RAIDs may be provided using any types of direct-attached storage devices and any types of CPUs in a computing device, as well as provide a variety of other benefits that would be apparent to one of skill in the art in possession of the present disclosure.

Figure 4:
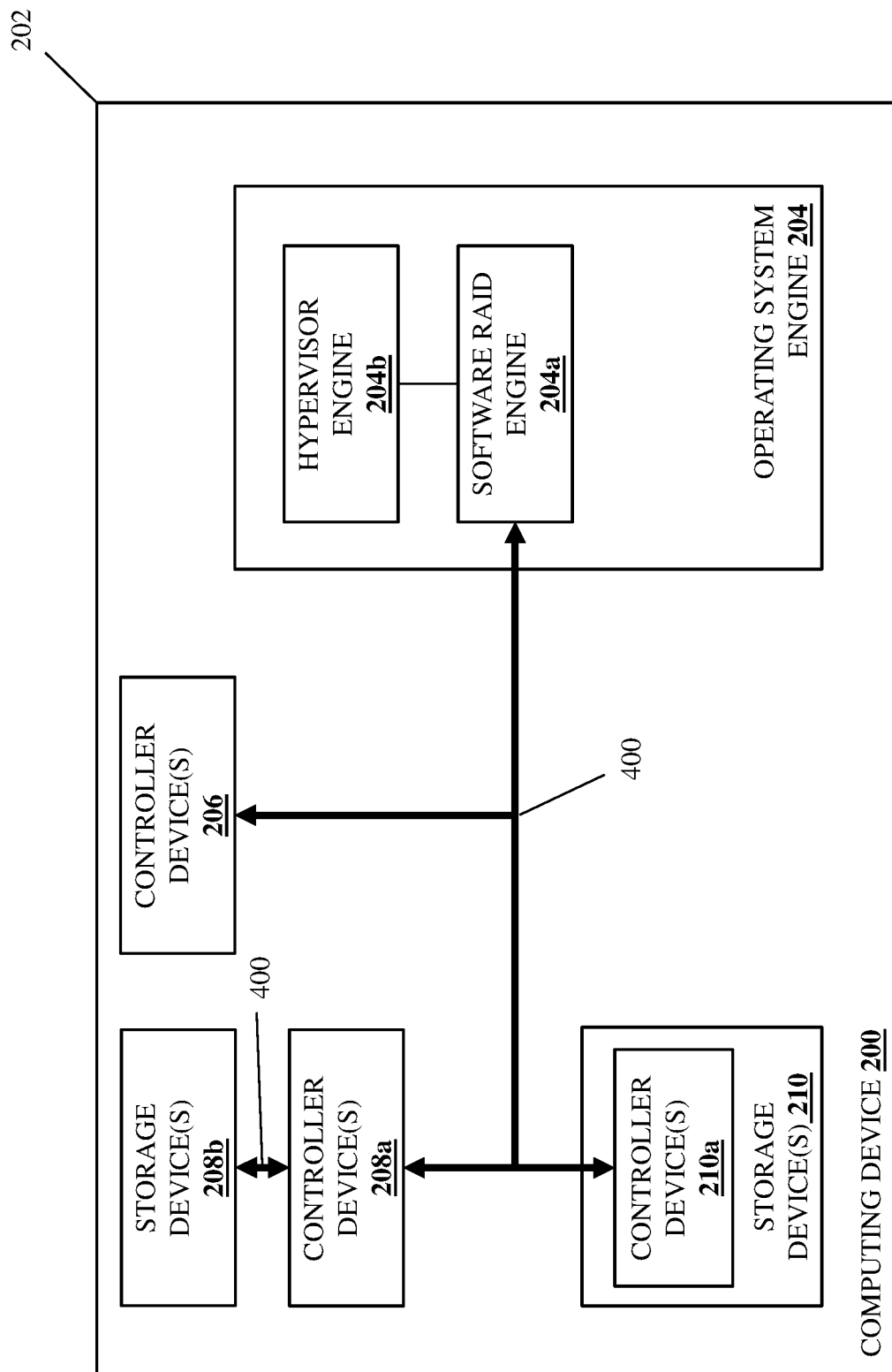
FIG. 4 is a schematic view illustrating an embodiment of the operation of the computing device of FIG. 2 during the method of FIG. 3.

The method 300 begins at block 302 where a software RAID subsystem configures a logical storage device using physical storage devices. With reference to FIG. 4, in an embodiment of block 302, the software RAID engine 204a in the computing device 200 may perform logical storage device configuration operations 400 that may include discovering each of the controller devices 206, 208a, and 210a and, in response, discovering each of the storage devices 208b and/or 210 coupled thereto, and then configuring a logical storage device using those storage devices 208b and/or 210. In a specific example, each of the storage device(s) 208a may be coupled to a PCIe controller device that is provided by one of the controller device(s) 208a discovered at block 302, and each of the storage device(s) 210 may include a PCIe controller device that is provided by one of the controller device(s) 210a discovered at block 302, while PCIe controller device(s) that are provided by the controller device(s) 206 and that are not coupled to storage devices may be discovered at block 302 as well.

For example, in response to the powering on, reset, reboot, and/or other initialization of the computing device 200, the computing device 200 may enter a pre-boot mode in which the software RAID engine 204a performs any of a variety of software RAID operations and/or other techniques that would be apparent to one of skill in the art in possession of the present disclosure in order to configure a RAID using the storage devices 208a and 210 that allows the software RAID engine 204a to present those storage devices 208a and 210 as one or more logical storage devices. As will be appreciated by one of skill in the art in possession of the present disclosure, the RAID maybe configured using the storage devices 208a and 210 with a variety of standard RAID levels such as a RAID0, RAID1, RAID2, RAID3, RAID4, RAID5, or RAID 6, as well as combinations of standard RAID levels (e.g., RAID 1+0, also known as RAID10), non-standard RAID levels, and/or any other RAID levels that would be apparent to one of skill in the art in possession of the present disclosure.

The method 300 then proceeds to block 304 where the software RAID subsystem allocates memory space for a direct-attached storage device software RAID system. In an embodiment, at block 304, the software RAID engine 204a in the computing device 200 may perform memory space allocation operations that may include allocating memory space for use by the direct-attached storage device software RAID system of the present disclosure. For example, the memory space allocation operations performed by the software RAID engine 204a may include allocating a memory space or other portion of the memory system that is used to provide the operating system engine 204 (e.g., operating system kernel memory) for use by the software RAID engine 204a to perform any of the direct-attached storage device software RAID operations or other functionality discussed below. As will be appreciated by one of skill in the art in possession of the present disclosure, the memory space or other portion of the memory system allocated for use by the direct-attached storage device software RAID system may be referred to a "heap memory" that may be dynamically allocated to the software RAID driver provided by the software RAID engine 204a (e.g., unlike memory space allocated to stacks), and one of skill in the art in possession of the present disclosure will recognize how the heap memory may be utilized to perform any of the functionality described below.

In a specific example, the allocation of the heap memory to the software RAID engine 204a may be performed during module initialization operations that are performed when an operating system provided by the operating system engine 204 is loaded and calls those module initialization operations, and the software RAID engine 204a may allocate the heap memory based on a number of storage devices (e.g., a maximum number of storage devices) that the software RAID engine 204a is configured to support. However, while a specific example of the allocation of memory space for use by the direct-attached storage device software RAID system of the present disclosure has been described, one of skill in the art in possession of the present disclosure will appreciate how memory space may be allocated for use by the direct-attached storage device software RAID system using a variety of techniques that will fall within the scope of the present disclosure as well.

Figure 5:
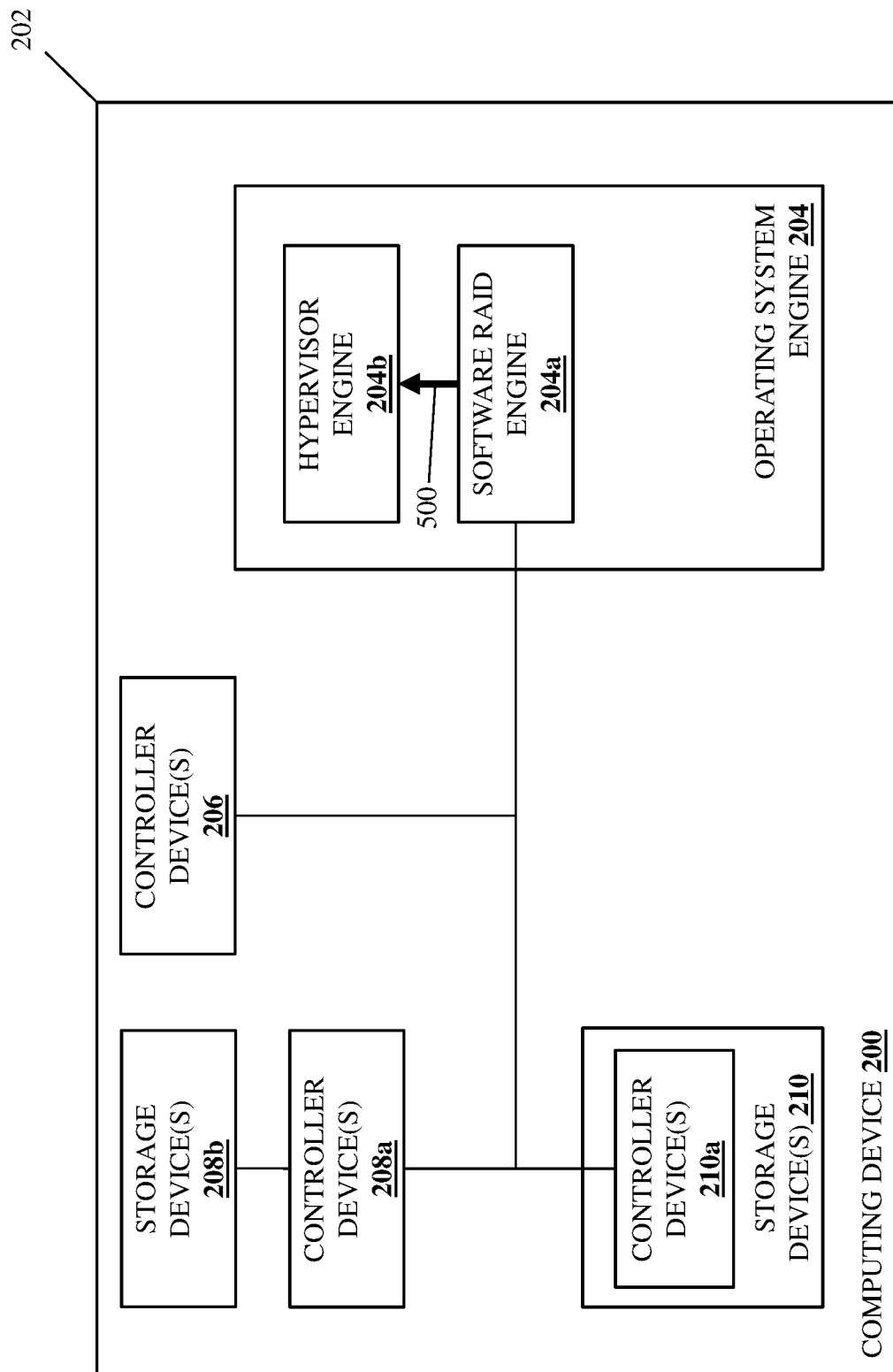
FIG. 5 is a schematic view illustrating an embodiment of the operation of the computing device of FIG. 2 during the method of FIG. 3.

The method 300 then proceeds to block 306 where the software RAID subsystem and the hypervisor subsystem register a controller device supported by the software RAID subsystem. With reference to FIG. 5, in an embodiment of block 306, the controller device registration operations may include the software RAID engine 204a in the computing device 200 performing supported controller device identification operations 500 that may include identifying controller devices that are supported by the software RAID engine 204a to the hypervisor engine 204b in the computing device 200. For example, any of the controller devices 206, 208a, and/or 210a discovered at block 302 as discussed above may be identified to the hypervisor engine 204b as supported controller devices at block 306. In a specific example, at block 306, the software RAID engine 204a may generate a Peripheral Component Interconnect (PCI) IDentification (PCIID) file that identifies the PCIe controller devices that are supported by the software RAID engine 204a, and may load or otherwise transmit that PCIID file to the hypervisor engine 204b. However, while a specific example of the identification of controller devices to the hypervisor engine 204b that are supported by the software RAID engine 204a has been described, one of skill in the art in possession of the present disclosure will appreciate how the software RAID engine 204a may identify supported controller devices to the hypervisor engine 204b using other techniques that will fall within the scope of the present disclosure as well.

Figure 6A:
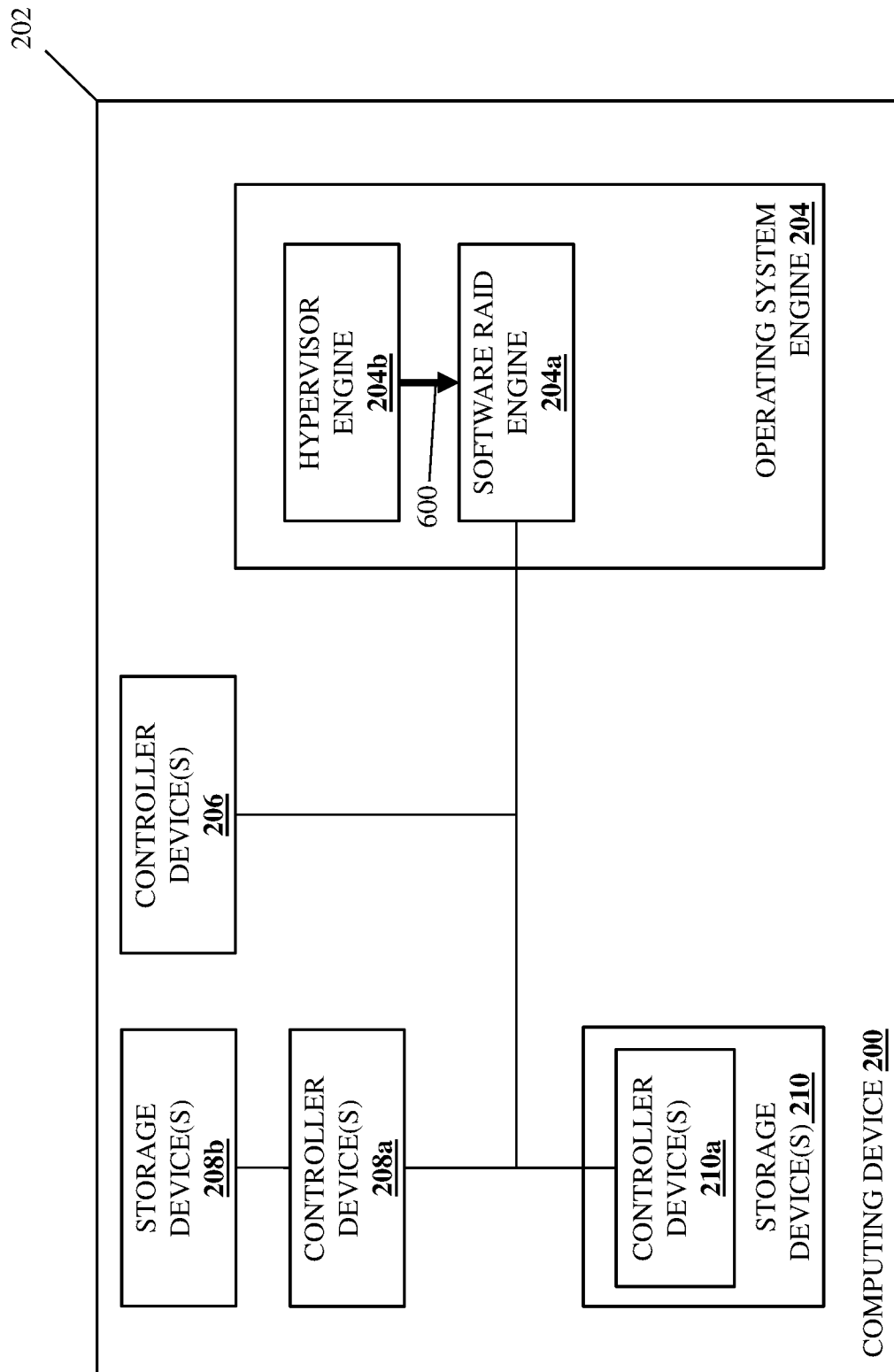
FIG. 6A is a schematic view illustrating an embodiment of the operation of the computing device of FIG. 2 during the method of FIG. 3.

With reference to FIG. 6A, in an embodiment of block 306, the controller device registration operations may also include the hypervisor engine 204b in the computing device 200 performing controller device attachment request operations 600 that may include the hypervisor engine 204b generating and transmitting a controller device attachment request for one of the controller devices that was identified as being supported by the software RAID engine 204a. For example, a VMkernal in the VMWARE®n ESXi hypervisor described above that provides the hypervisor engine 204b may generate and transmit an "AttachDevice" ESXi call that provides the controller device attachment request and that one of skill in the art in possession of the present disclosure will recognize provides an instruction to the software RAID engine to initialize and discover one of the controller devices that was identified as being supported via a SCSI transport layer. However, while a specific example of a controller device attachment request has been described, one of skill in the art in possession of the present disclosure will appreciate how the hypervisor engine 204b may request the initialization and discovery of controller devices using other techniques that will fall within the scope of the present disclosure as well.

Figure 6B:
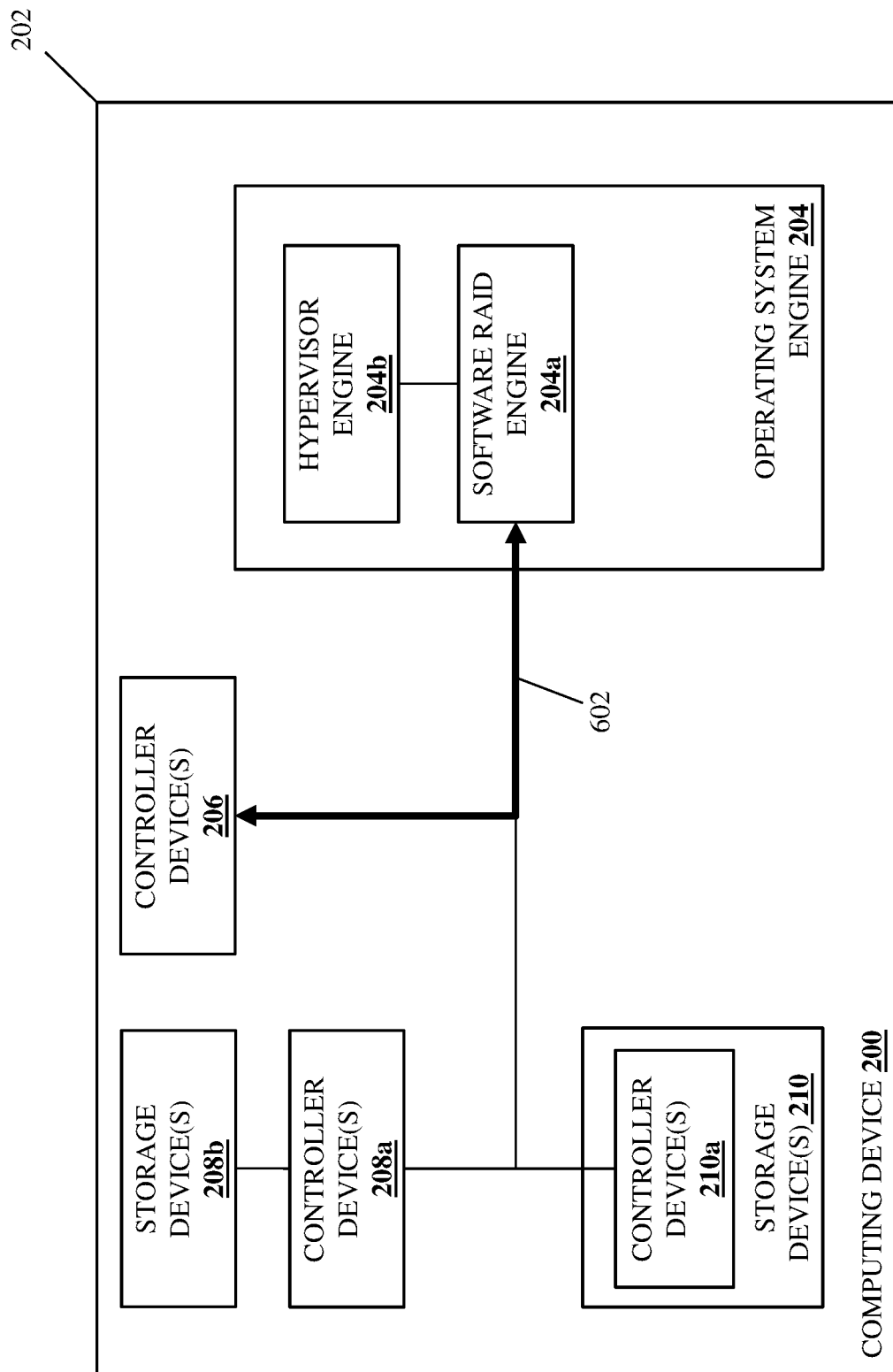
FIG. 6B is a schematic view illustrating an embodiment of the operation of the computing device of FIG. 2 during the method of FIG. 3.

With reference to FIG. 6B, in an embodiment of block 306 and in response to receiving the controller device attachment request from the hypervisor engine 204b, the controller device registration operations may also include the software RAID engine 204a in the computing device 200 performing initialization and discovery operations 602 that may include the software RAID engine 204a initializing and discovering, in the specific example provided in FIG. 6B, the one of the controller device(s) 206 identified by the hypervisor engine 204b in the controller device attachment request. As will be appreciated by one of skill in the art in possession of the present disclosure, the initialization and discovery operations 602 performed by the software RAID engine 204a may include any of a variety of initialization operations and discovery operations that would be apparent to one of skill in the art in possession of the present disclosure, and may depend on the protocol supported by that controller device (e.g., a SAS protocol, a SATA protocol, an NVMe protocol, etc.).

In some embodiments, following the initialization and discovery of the first controller device during the first iteration of block 306, the software RAID engine 204a in the computing device 200 may perform timer registration operations that may include registering a timer with the hypervisor engine 204b. As discussed below, some embodiments of the present disclosure may include the utilization of a timer to determine when the last controller device has been registered as part of the controller device registration operations performed across one or more iterations of block 306 of the method 300, and thus that timer may be registered by the software RAID engine 204a with the hypervisor engine 204b at block 306 using any of a variety of timer registration techniques that would be apparent to one of skill in the art in possession of the present disclosure. However, the registration of the timer is described as occurring at a particular point in method 300 (e.g., following initialization and discovery of the first controller device during the first iteration of block 306), one of skill in the art in possession of the present disclosure will appreciate how the timer may be registered at other points in the method 300 while remaining within the scope of the present disclosure as well. Furthermore, other embodiments of the method 300 may utilize other techniques to determine when the last controller device has been registered as part of the controller device registration operations across one or more iterations of block 306 of the method 300, and thus the timer registration operations may be skipped in those embodiments.

Figure 6C:
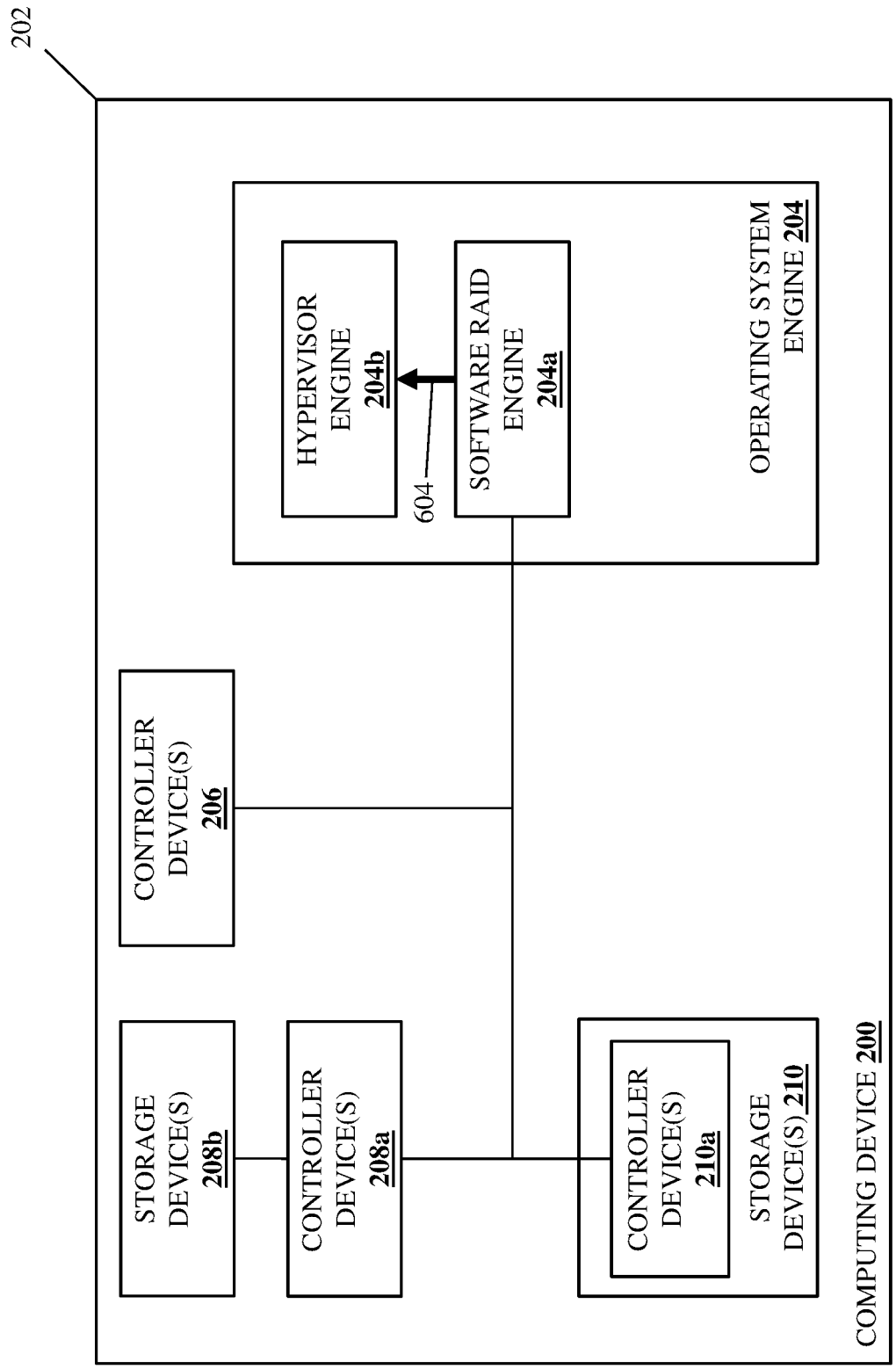
FIG. 6C is a schematic view illustrating an embodiment of the operation of the computing device of FIG. 2 during the method of FIG. 3.

With reference to FIG. 6C, in an embodiment of block 306 and in response to initializing and discovering the one of the controller device(s) 206 in the specific example provided in FIG. 6B, the controller device registration operations may also include the software RAID engine 204a in the computing device 200 performing controller device attachment confirmation operations 604 that may include the software RAID engine 204a confirming the completion of the controller device attachment request that was received from the hypervisor engine 204b for the one of the controller device(s) 206 in the specific example provided in FIG. 6B. For example, in response to the successful initialization and discovery of a connected controller device and its corresponding storage device(s), the software RAID engine 204a may confirm the attachment request to the hypervisor engine 204b. While not illustrated or discussed in detail, one of skill in the art in possession of the present disclosure will appreciate how the software RAID engine 204a may identify to the hypervisor engine 204b any failures of the initialization and discovery of any connected controller devices and its corresponding storage device(s) as well.

Figure 6D:
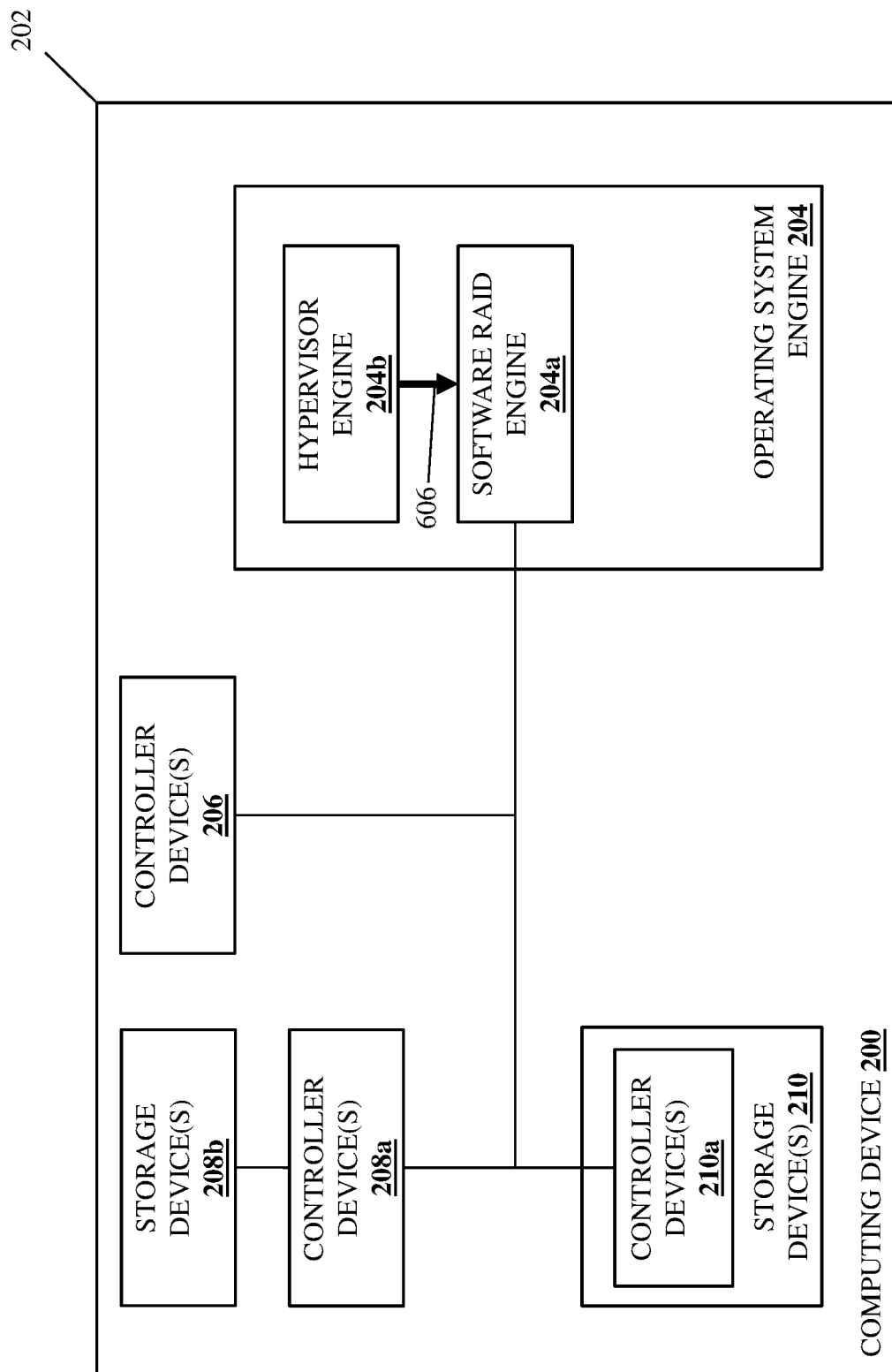
FIG. 6D is a schematic view illustrating an embodiment of the operation of the computing device of FIG. 2 during the method of FIG. 3.

With reference to FIG. 6D, in an embodiment of block 306, the controller device registration operations may also include the hypervisor engine 204b in the computing device 200 performing hypervisor registration request operations 606 that may include the hypervisor engine 204b generating and transmitting a hypervisor registration request to register the one of the controller devices in the specific example provided in FIG. 6B with the hypervisor engine 204b. For example, a VMkernal in the VMWARE®n ESXi hypervisor described above that provides the hypervisor engine 204b may generate and transmit an "ScanDevice" ESXi call that provides the hypervisor registration request and that one of skill in the art in possession of the present disclosure will recognize provides an instruction to the software RAID engine to register the one of the controller devices in the specific example provided in FIG. 6B in the hypervisor engine 204b. However, while a specific example of a hypervisor registration request has been described, one of skill in the art in possession of the present disclosure will appreciate how the hypervisor engine 204b may request the registration of controller devices in the hypervisor engine 204b using other techniques that will fall within the scope of the present disclosure as well.

Figure 6E:
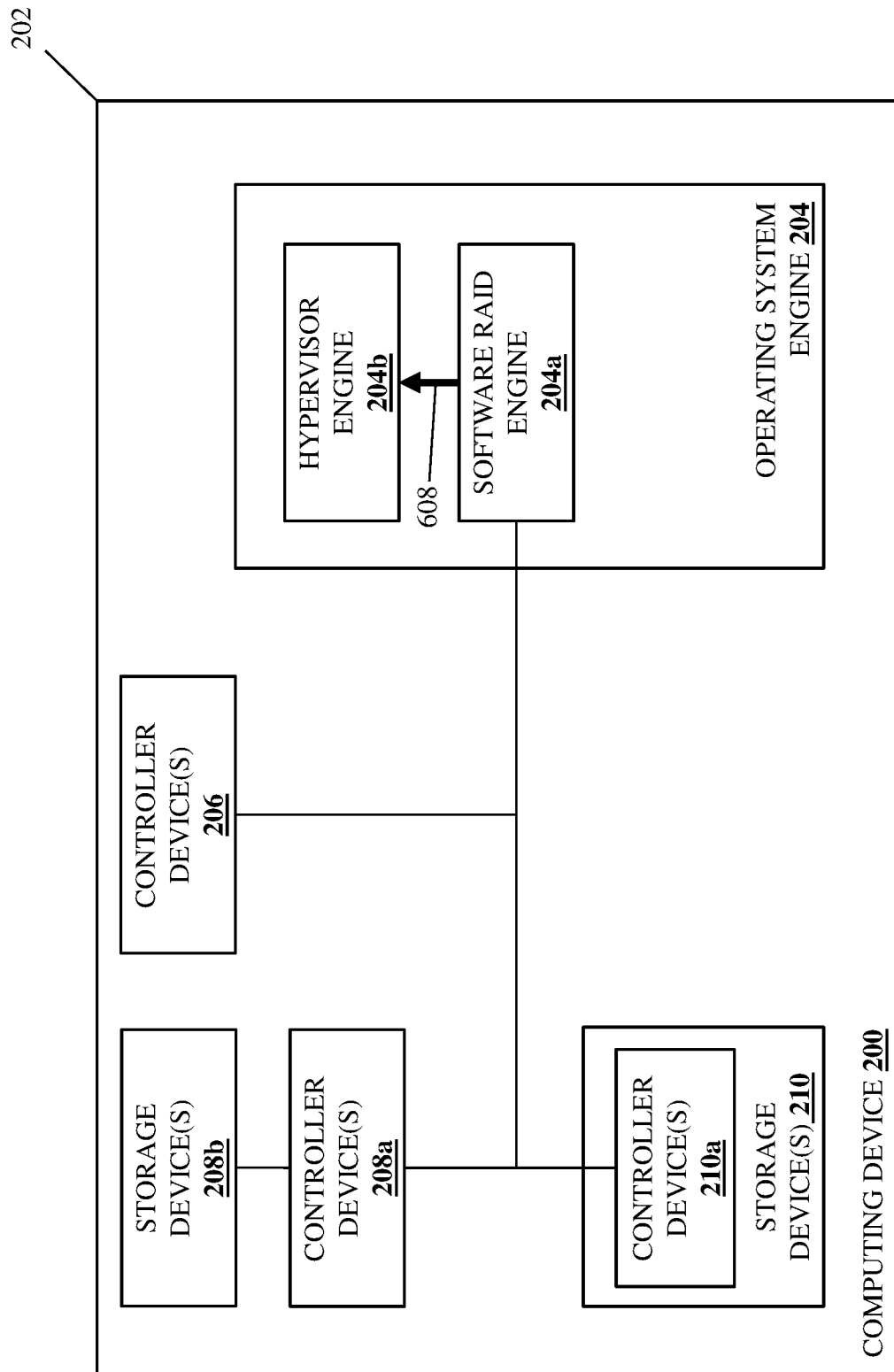
FIG. 6E is a schematic view illustrating an embodiment of the operation of the computing device of FIG. 2 during the method of FIG. 3.

With reference to FIG. 6E, in some embodiments of block 306 and in response to receiving the hypervisor registration request (e.g., the "ScanDevice" ESXi call), the controller device registration operations may also include the software RAID engine 204a in the computing device 200 performing hypervisor registration operations 608 that may include the software RAID engine 204a registering the one of the controller device(s) 206 in the specific example provided in FIG. 6B in the hypervisor engine 204b using any of a variety of hypervisor/controller device registration techniques that would be apparent to one of skill in the art in possession of the present disclosure. For example, in response to a "ScanDevice" ESXi call, the software RAID engine 204a may register the controller device with the hypervisor engine 204b and retrieve a "handle" for use in performing subsequent communications with that controller device, and then enable Input/Output (I/O) commands for the controller device from the hypervisor engine 204b once that registration is completed. However, in other embodiments of block 306 and in response to receiving the hypervisor registration request (e.g., the "ScanDevice" ESXi call), the hypervisor registration operations may instead include the software RAID engine 204a in the computing device 200 "holding", delaying, and/or otherwise waiting to perform the hypervisor registration operations 608 that register the one of the controller device(s) 206 in the specific example provided in FIG. 6B in the hypervisor engine 204b.

The method 300 then proceeds to decision block 308 where it is determined whether there is an additional controller device supported by the software RAID subsystem to register. In some embodiments of decision block 308, following the registration of the one of the controller device(s) 206 in the specific example provided in FIG. 6B in the hypervisor engine 204b at block 306, the software RAID engine 204a in the computing device 200 may perform timer activation operations in order to activate the timer discussed above that may have been registered with the hypervisor engine 204b in some embodiments of the present disclosure. The software RAID engine 204a may then monitor that timer at decision block 308 to determine whether another controller device attachment request (e.g., the "AttachDevice" ESXi call in the specific example provided above) for another of the controller devices 206, 208b, and/or 210a is received from the hypervisor engine 204b within a threshold time period. As will be appreciated by one of skill in the art in possession of the present disclosure, the software RAID engine 204a may utilize any of a variety of threshold time periods that, after which, the software RAID engine 204a may assume that no further controller device attachment requests will be received (i.e., that there are no further controller devices to be registered with the hypervisor engine 204b).

However, while the use of a timer and threshold time period following registration of any particular controller device in order to determine whether there are any other controller devices to register at decision block 308 has been described, as discussed above other techniques for determining whether there are any other controller devices to register at decision block 308 will fall within the scope of the present disclosure as well. For example, other embodiments of the present disclosure may provide a software driver in the computing device 200 that is configured to identify a number of available controller devices in the computing device 200, and then transmit that number of available controller devices to the software RAID engine 204a for use in determining at decision block 308 whether the number of controller devices registered with the hypervisor engine 204a has reached that number of available controller devices. As such, the determination of whether there are any other controller devices to register in the hypervisor engine 204b during decision block 308 of the method 300 may be performed in a variety of manners while remaining within the scope of the present disclosure.

If, at decision block 308, it is determined that there is an additional controller device supported by the software RAID subsystem to register, the method 300 returns to block 306. As such, the method 300 may loop such that the software RAID engine 204a and the hypervisor engine 204b in the computing device 200 operate to register any additional controller device with the hypervisor engine 204b. Thus, different iterations of block 306 and decision block 308 may cause the software RAID engine 204a and the hypervisor engine 204b to register each of the controller devices in the computing device 200 in the hypervisor engine 204b. For example, for any remaining controller devices 206, 208a, and 210a, the controller device attachment request operations 600, initialization and discovery operations 602, controller device attachment confirmation operations 604, hypervisor registration request operations 606, and hypervisor registration operations 608 described above for block 306 may be performed for that controller device, and block 306 may repeat until it is determined that there are no additional controller devices to register with the hypervisor engine 204b.

Figure 7:
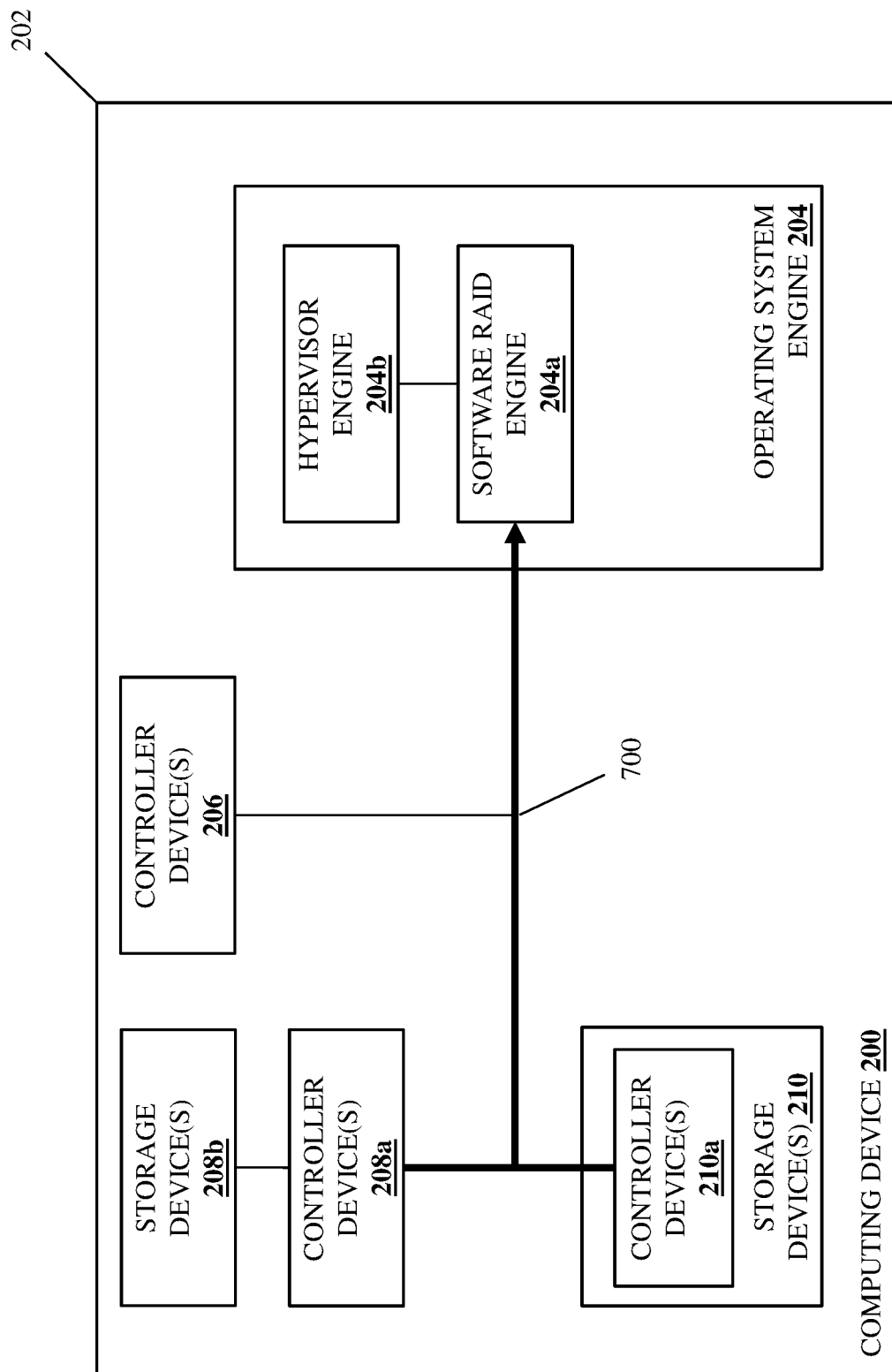
FIG. 7 is a schematic view illustrating an embodiment of the operation of the computing device of FIG. 2 during the method of FIG. 3.

If, at decision block 308, it is determined that there are no additional controller devices supported by the software RAID subsystem to register, the method 300 proceeds to block 310 where the software RAID subsystem creates one or more logical storage subsystems in the logical storage device. In an embodiment, at block 310 and in response to determining that there are no additional controller devices to register with the hypervisor engine 204b, the software RAID engine 204a in the computing device 200 may perform logical storage subsystem creation operations that may include creating one or more logical storage subsystems in the logical storage device provided by the storage devices 208b and 210. For example, with reference to FIG. 7, in some embodiments the logical storage subsystem creation operations may include the software RAID engine 204a performing metadata retrieval operations 700 that may include retrieving metadata from the controller devices 208a and 210a coupled to each of the storage devices 208b and 210 that are being used to provide the logical storage device.

As will be appreciated by one of skill in the art in possession of the present disclosure, the metadata retrieved from the controller devices 208a and 210a coupled to each of the storage devices 208b and 210 may identify one or more logical storage subsystems (e.g., virtual disks, RAID volumes, RAID Logical Unit Numbers (LUNs), and/or logical storage subsystems known in the art) that will be provided by each of the storage devices 208b and 210, as well as any other information that one of skill in the art in possession of the present disclosure would recognize as providing for the creation of the logical storage subsystems in the logical storage device. As such, at block 310, the logical storage subsystem creation operations performed by the software RAID engine 204a may include using the metadata retrieved from the controller devices 208a and 210a coupled to each of the storage devices 208b and 210 to "build", generate, and/or otherwise create one or more logical storage subsystems (e.g., virtual disks, RAID volumes, RAID LUNs, and/or logical storage subsystems known in the art) in the logical storage device that is provided by the storage devices 208b and 210. However, while a specific example of the creation of logical storage subsystem(s) in a logical storage device has been described, one of skill in the art in possession of the present disclosure will appreciate how the logical storage subsystems may be created in the logical storage device using a variety of techniques that will fall within the scope of the present disclosure as well.

Figure 8:
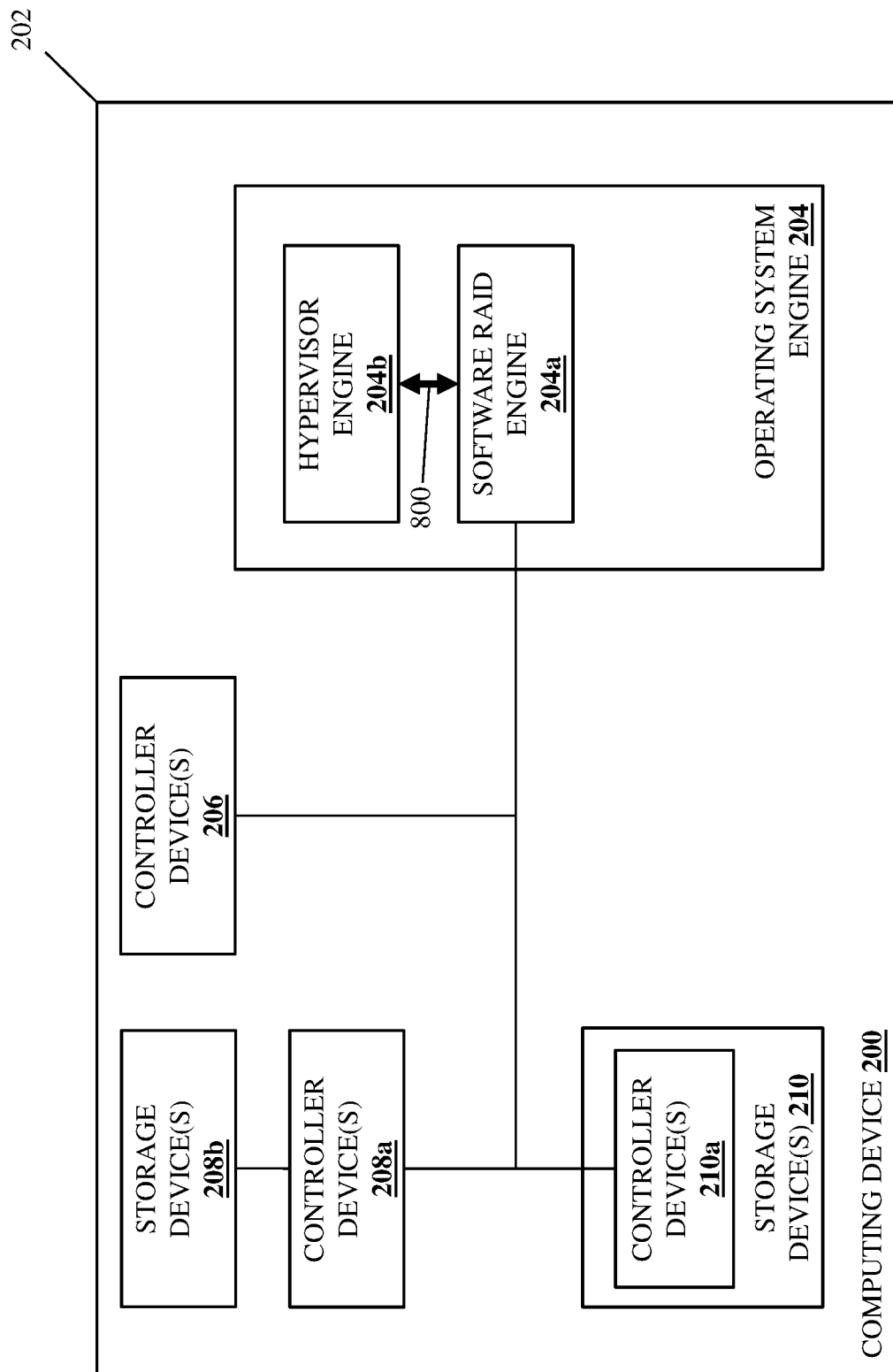
FIG. 8 is a schematic view illustrating an embodiment of the operation of the computing device of FIG. 2 during the method of FIG. 3.

The method 300 then proceeds to block 312 where the software RAID subsystem configures command communications with the hypervisor subsystem. With reference to FIG. 8, in an embodiment of block 312, the software RAID engine 204a in the computing device 200 may perform command communication configuration operations 800 that may include identifying a primary controller device from the plurality of controller devices 206, 208a, and 210a. For example, the controller device 206, 208a, or 210a identified as the primary controller device at block 312 may be a PCIe controller device that may have been designated by a computing device manufacturer to operate as the primary controller device based on that PCIe controller device being common to a variety of different configurations of computing devices provided by the computing device manufacturer (and thus being present in each of those computing devices/computing device configurations if needed to implement the direct-attached storage device software RAID system of the present disclosure). In another example, the controller device 206, 208a, or 210a identified as the primary controller device at block 312 may be a PCIe controller device that is not configured to be "hot removed" from the computing device 200. However, while a few specific examples of controller devices that may be identified as primary controller devices have been described, one of skill in the art in possession of the present disclosure will appreciate how any of a variety of criteria may be used to designate the controller device that may be identified as the primary controller device at block 312 while remaining within the scope of the present disclosure as well.

In a specific example, at block 312, the software RAID engine 204a in the computing device 200 may perform command communication configuration operations that may also include identifying a number of SCSI queues in a SCSI layer of the hypervisor engine 204b that are used by the hypervisor engine 204b to communicate with the software RAID engine 204a, and one of skill in the art in possession of the present disclosure will appreciate how any Input/Output (I/O) commands generated by the hypervisor engine 204b (e.g., the VMKernal discussed above) will be mapped to one of those SCSI queues. Furthermore, the SCSI queues may be mapped to SAS, SATA, and/or NVMe protocol queues in the software RAID engine 204a so that I/O commands generated by the hypervisor engine 204b may be transmitted to the storage devices 208b and 210. As will be appreciated by one of skill in the art in possession of the present disclosure, the allocation of SCSI queues is typically dependent on the number of processing cores available in the processing system that provides the hypervisor engine 204b, and thus the software RAID engine 204a may request the SCSI queues from the hypervisor engine 204b (e.g., the VMKernal described herein) based on the SCSI queue requirements and the number of processor cores that are available. However, while a few examples of command communication configuration operations have been described, one of skill in the art in possession of the present disclosure will appreciate how a variety of configuration operations may be performed in order to enable the communication functionality described below while remaining within the scope of the present disclosure.

In embodiments in which the software RAID engine 204a in the computing device 200 "holds", delays, and/or otherwise waits to perform the hypervisor registration operations 608 that register the controller device in the hypervisor engine 204b when receiving the hypervisor registration requests (e.g., "ScanDevice" ESXi calls) discussed above, following the command communication configuration operations at block 312 the software RAID engine 204a may perform the hypervisor registration operations 608 in response to each of those hypervisor registration requests (e.g., the software RAID engine 204a may enable I/O commands for each storage device corresponding to a respective "ScanDevice" ESXi call provided by the hypervisor engine 204b for that storage device). Following those hypervisor registration operations, or following the command configuration operations at block 312 in embodiments in which those hypervisor registration operations are performed upon receiving the hypervisor registration requests during block 306, the direct-attached storage device software RAID system completes initialization such that the RAID volume provided by the logical storage device is configured for use, and one of skill in the art in possession of the present disclosure will appreciate how a full RAID volume or partial RAID volume may be configured via the method 300 as described above, and may be used for runtime data, during boot/initialization, and/or for other RAID volume uses that would be apparent to one of skill in the art in possession of the present disclosure.

Figure 9:
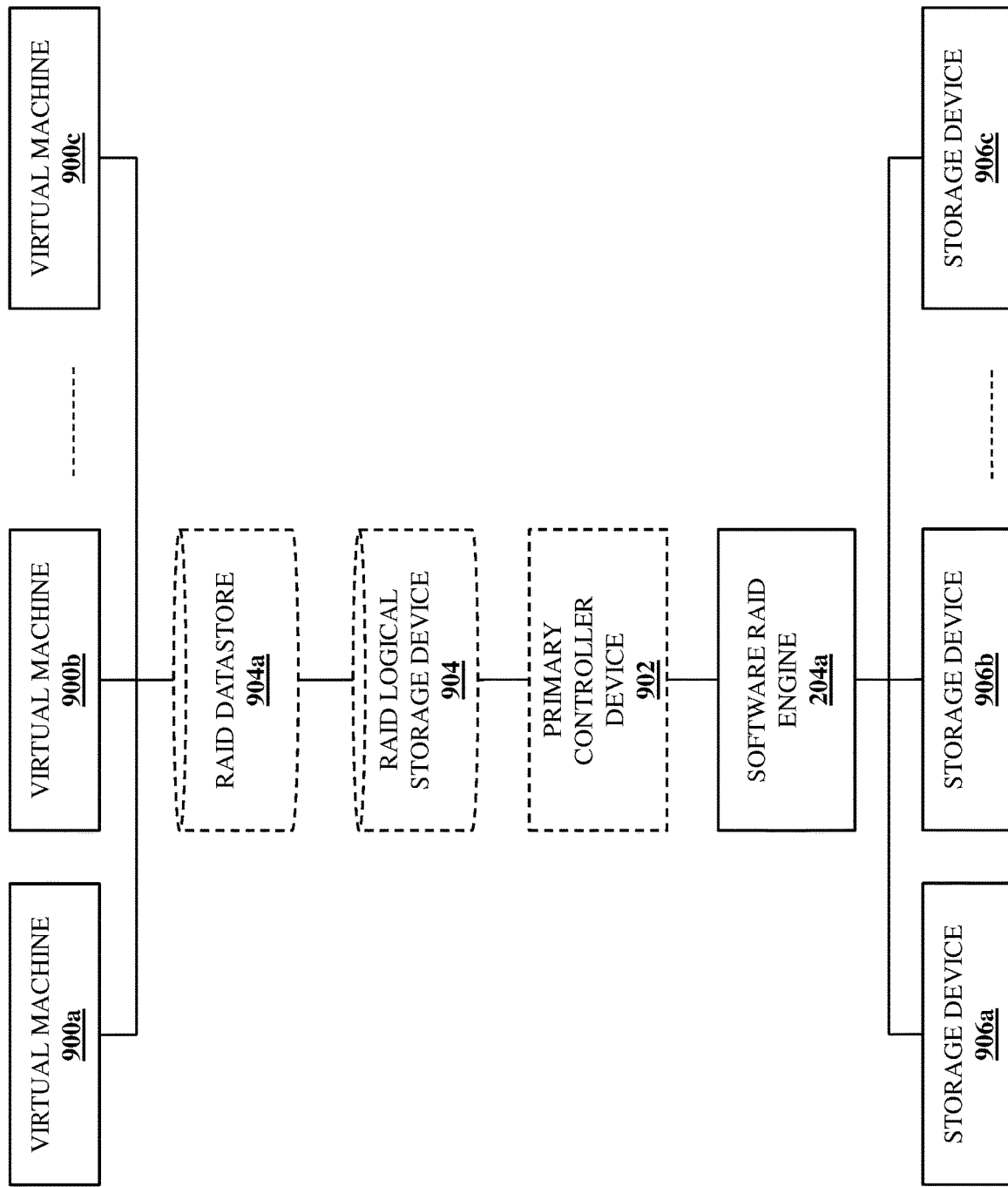
FIG. 9 is a schematic view illustrating an embodiment of the operation of the computing device of FIG. 2 during the method of FIG. 3.

The method 300 then proceeds to block 314 where the software RAID subsystem presents one of the controller devices to the hypervisor subsystem as a primary controller device that is connected to the logical storage device. With reference to FIG. 9, in an embodiment of block 314 and following the completion of the initialization of the direct-attached storage device software RAID system, the software RAID engine 204a may present, to a plurality of virtual machines 900a, 900b, and up to 900c that are provided by the hypervisor engine 204b in the computing device 200, a primary controller device 902 (which as discussed above is provided by one of the controller devices 206, 208a, or 210a) as being connected to a RAID logical storage device 904 that includes a RAID datastore 904a (e.g., which may be provided "on top" of RAID LUN(s)) and that is provided using a plurality of physical storage devices 906*a*, 906*b*, and up to 906*c* (which may be any of the storage devices 208*a* and 210 registered with the hypervisor engine 204*b* as discussed above). As will be appreciated by one of skill in the art in possession of the present disclosure, the RAID datastore 904*a* may be provided in the RAID logical storage device 904 when the hypervisor engine 204*b* is provided by the VMWARE® ESXi hypervisor discussed above, and refers to a partition that has a Virtual Machine File System (VMFS) file system type and that is created using VMWARE® tools (or the VMWARE® ESXi hypervisor itself) on top of RAID volumes/LUNs that are exposed to the VMWARE® ESXi hypervisor.

To provide a specific example, one of the controller device(s) 206 that is not connected to a storage device may be presented to the hypervisor engine 204*b* as being connected to the RAID logical storage device 904, although one of skill in the art in possession of the present disclosure will appreciate how any one of the controller devices 208*a* or 210*a* may be presented to the hypervisor engine 204*b* as being connected to the RAID logical storage device 904 while remaining within the scope of the present disclosure as well. As will be appreciated by one of skill in the art in possession of the present disclosure, any of the controller devices 206, 208*a*, and 210*a* that are not presented to the hypervisor engine 204*b* as being connected to the RAID logical storage device 904 may instead be presented to the hypervisor engine 204*b* as secondary controller devices that are not connected to the RAID logical storage device 904 or any of the storage devices 906*a*-906*c* (i.e., despite at least some of those controller devices being physically connected to those storage devices 906*a*-906*c*).

As such, each of the logical storage subsystems (e.g., virtual disks, RAID volumes, RAID LUNs, and/or logical storage subsystems known in the art) provided by the RAID logical storage device 904 are exposed to the virtual machines 900*a*-900*c* provided by the hypervisor engine 204*b* (e.g., the VMKernal discussed above) via the primary controller device 902. Thus, using some of the specific examples discussed above, each of the logical storage subsystems (e.g., virtual disks, RAID volumes, RAID LUNs, and/or logical storage subsystems known in the art) provided by storage devices 906*a*-906*b* may be presented to a user of the operating system provided by the operating system engine 204 as SCSI storage devices or otherwise being provided by SCSI storage devices.

Figure 10:
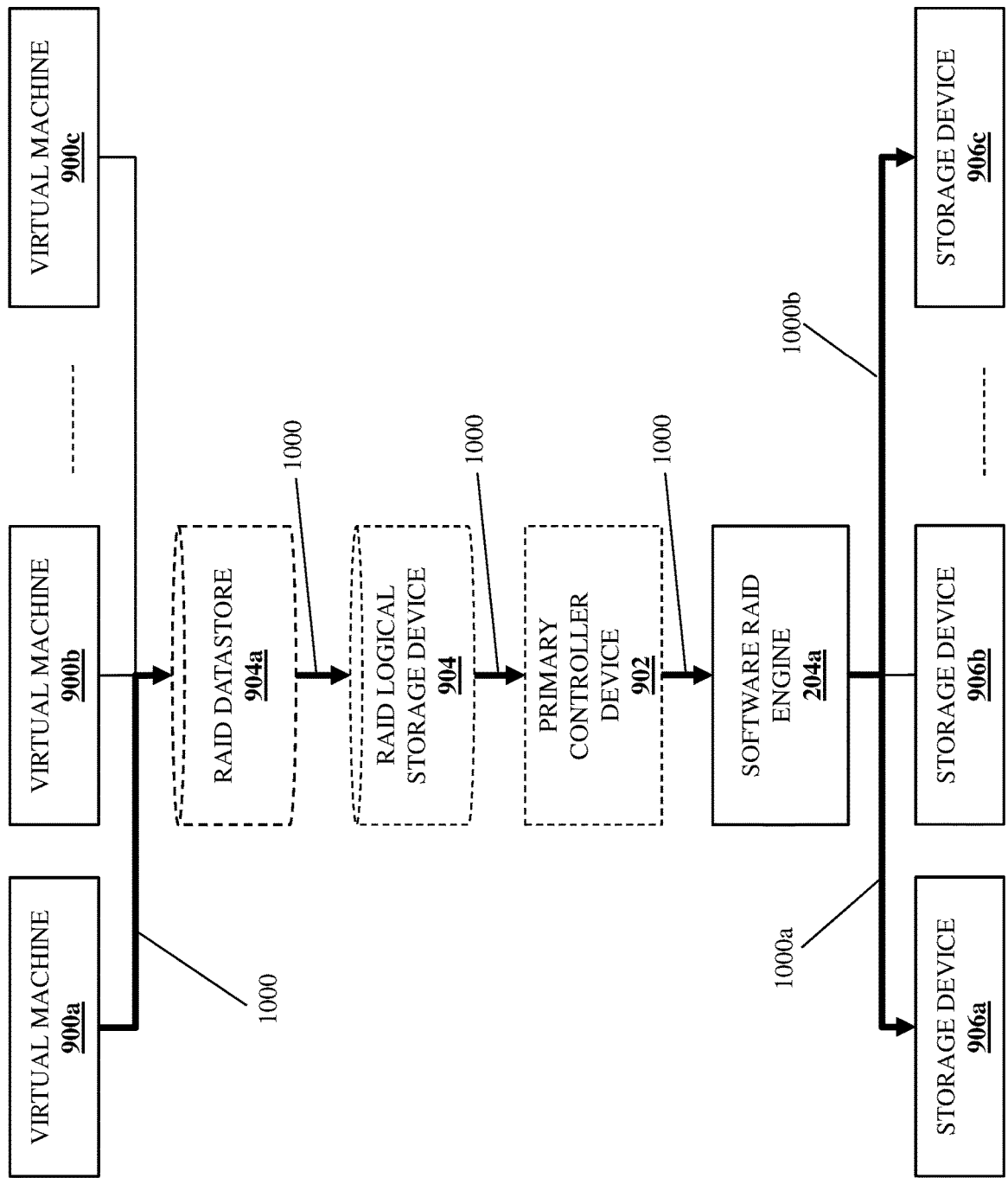
FIG. 10 is a schematic view illustrating an embodiment of the operation of the computing device of FIG. 2 during the method of FIG. 3.

The method 300 then proceeds to block 316 where the software RAID subsystem receives a command from the hypervisor subsystem that is directed to a primary controller device and that identifies a logical storage subsystem. With reference to FIG. 10, in an embodiment of block 316, the virtual machine 900*a* provided by the hypervisor engine 204*b* in the computing device 200 may perform command provisioning operations 1000 that include generating a command that identifies a logical storage subsystem provided by the RAID logical storage device 904 (e.g., via the RAID datastore 904*a* as illustrated in FIG. 10), and transmitting that command to the primary controller device 902 that is presented as being connected to the RAID logical storage device 904, which one of skill in the art in possession of the present disclosure will appreciate will result that in that command being received by the software RAID engine 204*a* in the computing device 200.

In an embodiment, the command transmitted by the virtual machine 900*a* provided by the hypervisor engine 204*b* to the software RAID engine 204*a* may include I/O commands such as a read command, a write command, and/or any other RAID commands that would be apparent to one of skill in the art in possession of the present disclosure. Furthermore, while the virtual machine 900*a* is illustrated and described as providing the command received by the software RAID engine 204*a* at block 316, one of skill in the art in possession of the present disclosure will appreciate how any of the virtual machines 900*b*-900*c* may provide commands in a similar manner while remaining within the scope of the present disclosure as well.

Using the specific example provided above in which the software RAID engine 204*a* is provided by a SCSI-based driver, any commands received at block 316 by the software RAID engine 204*a* from the virtual machines 900*a*-900*c* provided by the hypervisor engine 204*b* may be SCSI commands. Furthermore, as discussed in some of the specific examples above, the any commands received at block 316 by the software RAID engine 204*a* from the virtual machines 900*a*-900*c* may be mapped to SCSI queues in the hypervisor engine 204*b* that are used to communicate with the software RAID engine 204*a* provided by the SCSI-based driver, and thus the software RAID engine 206*a* may receive those commands via the accessing of those SCSI queues.

The method 300 then proceeds to block 318 where the software RAID subsystem transmits the command to a subset of physical storage devices that provide the logical storage subsystem via respective controller device(s) that couple the software RAID subsystem to that subset of physical storage devices. With continued reference to FIG. 10, in an embodiment of block 318, the software RAID engine 204*a* may perform command transmission operations 1000*a* and 100*b* that, in the specific example illustrated in FIG. 10, includes transmitting the command received at block 316 to the storage device 906*a* and the storage device 906*c* via their respective controller device(s) (e.g., any of the controller device(s) 208*a* and 210*a*) based on those storage devices 906*a* and 906*c* providing the logical storage subsystem identified in the command received by the software RAID engine 204*a* from the virtual machine 900*a*. As will be appreciated by one of skill in the art in possession of the present disclosure, the commands 1000*a* and 1000*b* transmitted to the storage devices 906*a* and 906*c* may be provided by modified versions of the command 1000 received from the virtual machine 900*a* (e.g., SCSI commands received from the virtual machine 900*a* may be translated to a protocol supported by the controller device/storage device to which it is transmitted.

For example, in response to receiving the command from the virtual machine 900*a* provided by the hypervisor engine 204*b* in the computing device 200, the software RAID engine 204*a* in the computing device 200 may determine which of the storage devices 906*a*-90*bc* provide the logical storage subsystem identified in that command (e.g., the storage devices 906*a* and 906*c* in this specific example). As discussed above, in some specific examples, SCSI queues in hypervisor engine 204*b* may be mapped to SAS, SATA, and/or NVMe protocol queues in the software RAID engine 204*a*, and thus the software RAID engine 204*a* may provide any commands received from the virtual machines 900*a*-900*c* in the protocol queues associated with the protocol utilized by the storage devices that provide the logical storage subsystem to which those commands are directed. As such, the command received by the software RAID engine 204*a* from the virtual machine 900*a* may be placed in a protocol queue associated with the protocol used by the storage device 906*a*, as well as in a protocol queue associated with the protocol used by the storage device 906*c*.

In embodiments in which the software RAID engine 204a is provided by a SCSI-based driver and the commands received from the virtual machine 900a are SCSI commands, in the event the storage devices 906a and/or 906c are SAS storage devices or otherwise use the SAS protocol, SCSI commands may be placed in a SAS protocol queue in the software RAID engine 204a and then transmitted to the storage devices 906a and/or 906c via their respective controller device(s) (e.g., any of the controller device(s) 208a and 210a). However, in the event the storage devices 906a and/or 906c are SATA storage devices or otherwise use the SATA protocol, SCSI commands may be placed in a SATA protocol queue in the software RAID engine 204a, translated using a SCSI translation layer in the software RAID engine 204a (e.g., a SCSI-to-Frame Information Structure (FIS) translation), and then transmitted to the storage devices 906a and/or 906c via their respective controller device(s) (e.g., any of the controller device(s) 208a and 210a). Similarly, in the event the storage devices 906a and/or 906c are NVMe storage devices or otherwise use the NVMe protocol, SCSI commands may be placed in an NVMe protocol queue in the software RAID engine 204a, translated using a SCSI translation layer in the software RAID engine 204a (e.g., a SCSI-to-NVMe translation), and then transmitted to the storage devices 906a and/or 906c via their respective controller device(s) (e.g., any of the controller device(s) 208a and 210a).

However, while a few specific examples of the translation of commands received from the virtual machines 900a-900c provided by the hypervisor engine 204b before providing them to the storage devices 906a-906c via their respective controller devices have been described, one of skill in the art in possession of the present disclosure will appreciate that other command translations may be performed while remaining within the scope of the present disclosure as well. For example, one of skill in the art in possession of the present disclosure will appreciate how a PCIe controller device connected to a SAS controller device will operate as a SAS controller that utilizes the SAS protocol, and thus no command translations may be needed in such situations. Similarly, a PCIe controller device connected to a SATA controller device will operate as a SATA controller that utilizes the SATA protocol, and thus SCSI-to-FIS translations may be needed in such situations.

The method 300 then returns to block 316. As such, the method 300 may loop such that the software RAID engine 204a in the computing device 200 receives commands from the virtual machines 900a-900c provided by the hypervisor engine 204b in the computing device 200 transmits those commands to the storage devices 906a-906c via their respective controllers as long as the storage devices 906a-906c are being used to provide the RAID logical storage device 904/RAID datastore 904a to the virtual machines 900a-900c. While not described in detail herein, in the event the storage devices 906a-906c will no longer be used to provide the RAID logical storage device 904/RAID datastore 904a to the virtual machines 900a-900c, the software RAID engine 204a may disconnect the controller device(s) 206, 208a, and 210a from the hypervisor engine 204b (e.g., via DetachDriver ESXi calls), as well as perform any other operations that would be apparent to one of skill in the art in possession of the present disclosure.

Thus, systems and methods have been described that provide for the presentation by a SCSI-based software RAID driver to a hypervisor of a single, primary PCIe controller device as being connected to a RAID logical storage device provided by a plurality of SAS, SATA, and/or NVMe physical storage devices, with the SCSI-based software RAID driver receiving I/O commands from the hypervisor that are directed to the primary PCIe controller device and that identify a RAID logical storage subsystem that is included in the RAID logical storage device, and transmitting those commands to a subset of the SAS, SATA, and/or NVMe physical storage devices that provide that RAID logical storage subsystem via respective PCIe controller device(s) that couple the SCSI-based software RAID driver to that subset of SAS, SATA, and/or NVMe physical storage devices. As such, software RAID support in hypervisor subsystem like the VMWARE® ESXi hypervisor discussed above is enabled in direct-attached storage device configurations for any types of storage devices and any types of CPUs, thus allowing the creation of a RAID using any available storage devices in a variety of computing devices. As such, RAID systems may be configured from a larger variety of storage devices and using spanned PCIe controllers, addressing several issues with the conventional RAID systems discussed above.

Figure 11A:
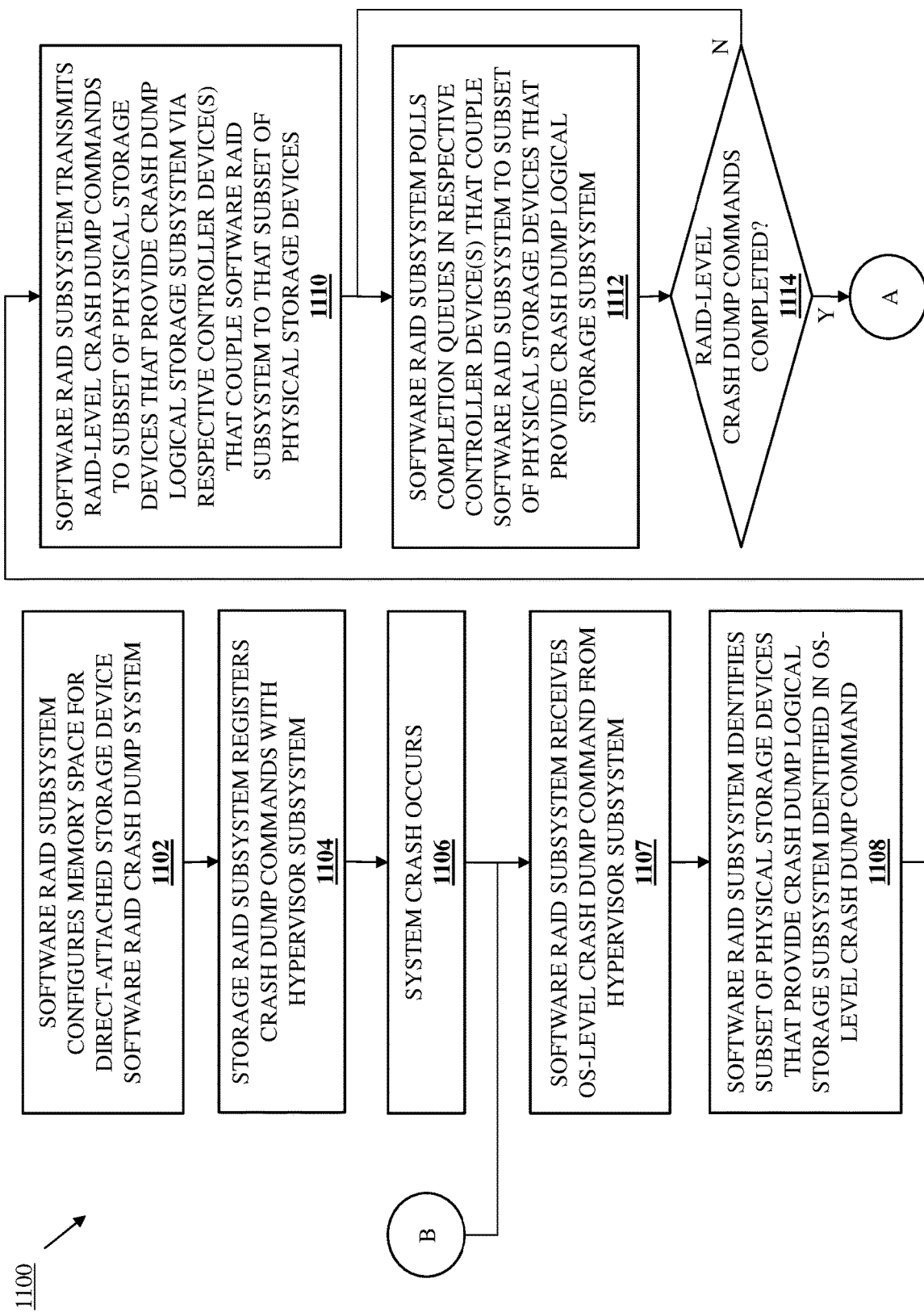
FIG. 11A is a flow chart illustrating an embodiment of a portion of a method for providing crash dumps in a software RAID using direct-attached storage devices in a computing device.
Figure 11B:
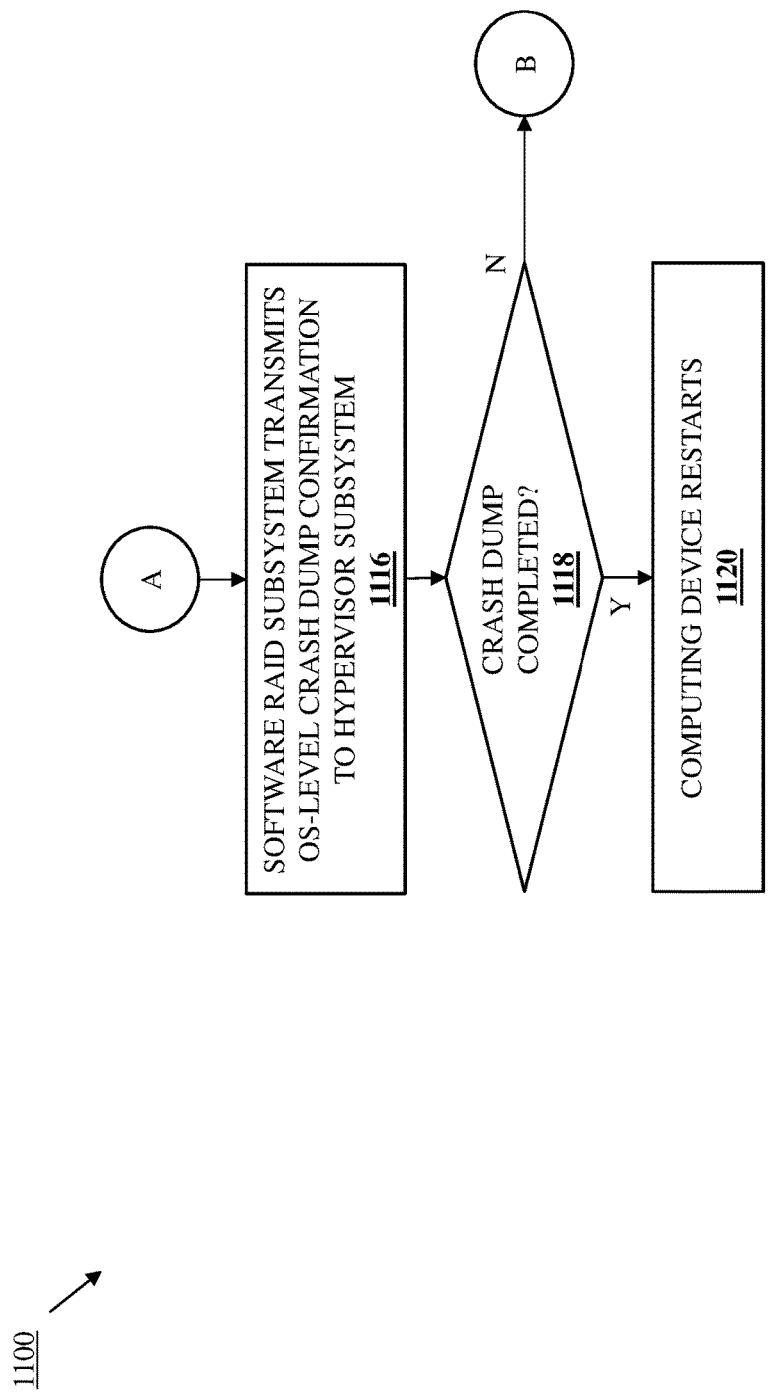
FIG. 11B is a flow chart illustrating an embodiment of a portion of a method for providing crash dumps in a software RAID using direct-attached storage devices in a computing device.

Referring now to FIGS. 11A and 11B, an embodiment of a method 1100 for providing crash dumps in a software Redundant Array of Independent Disk (RAID) using direct-attached storage devices in a computing device is illustrated. As discussed below, the systems and methods of the present disclosure provide for the presentation by a software RAID subsystem to a hypervisor subsystem of a single, primary controller device as being connected to a logical storage device provided by a plurality of physical storage devices, with the software RAID subsystem receiving crash dump commands from the hypervisor subsystem that are directed to the primary controller device and that identify a crash dump logical storage subsystem that is included in the logical storage device, and transmitting a respective second crash dump command to each of a subset of the plurality of physical storage devices that provide the crash dump logical storage subsystem via a respective one of the plurality of controller devices that couples the software RAID subsystem to that physical storage device, confirming completion of the respective second crash dump commands and, in response, transmitting a crash dump confirmation to the hypervisor subsystem. As such, crash dump operations are enabled using any logical storage subsystems (e.g., RAID LUNs or other RAID volumes) in a logical storage device regardless of whether that logical storage subsystem is "spanned" (e.g., provided using physical storage devices connected to two or more controller devices) or "non-spanned" (e.g., provided using physical storage devices connected to the same controller device).

As will be appreciated by one of skill in the art in possession of the present disclosure, the method 1100 may be performed prior to, during, and/or following the method 300 discussed above, and thus any of the blocks of the method 300 may be performed prior to the performance of any of the blocks of the method 1100 in order to configure the software RAID engine 204a, the hypervisor engine 204b, the operating system 204, the controller devices 206, 208a, and 210a, and/or the storage devices 208b and 210 to perform any of the functionality described below. In a particular example, the software RAID subsystem 204a in the computing device 200 may perform any of blocks 302, 304, 306, 308, 310, 312, and/or 316 of the method 300 prior to or during the performance of the method 1100 in order to configure the logical storage device using the storage devices 208a and 210, allocate memory space for the direct-attached storage device software RAID subsystem, register the controller devices 208a and 210a with the hypervisor engine 204b, create logical storage subsystems in the logical storage device, configure command communications with the hypervisor engine 204b, and/or present one of the controller devices 206, 208a, and 210a as the primary controller device connected to the logical storage device, while remaining within the scope of the present disclosure as well.

The method 1100 begins at block 1102 where a software RAID subsystem configures memory space for the direct-attached storage device software RAID crash dump system of the present disclosure. As will be appreciated by one of, block 1102 of the method 1100 may be provided during a "normal" or "runtime" mode for the computing device 200 and prior to the system crash described below. In an embodiment, at block 1102, the software RAID engine 204a in the computing device 200 may perform memory space configuration operations that may include configuring memory space or another portion of the memory system that is used to provide the operating system engine 204 (e.g., operating system kernel memory) for use by the software RAID engine 204a to perform any of the direct-attached storage device software RAID crash dump operations or other functionality discussed below. In a specific example, the memory space configuration operations performed by the software RAID engine 204a may include configuring the "heap memory" discussed above that was dynamically allocated to the software RAID driver provided by the software RAID engine 204a at block 304 of the method 300 for the crash dump operations described below. For example, one of skill in the art in possession of the present disclosure will appreciate how "crash dump" heap memory may be configured at block 1102 of the method 1100 that is separate from the heap memory that was allocated for the operations of the direct-attached storage device software RAID system at block 304 of the method 300 (e.g., each may be provided by different portions of operating system memory), and may be allocated a crash dump memory size that is sufficient to perform any crash dump operations that would be apparent to I in the art in possession of the present disclosure.

In some embodiments, the memory space configuration operations may include configuring the "heap memory" at block 1102 for crash dump operations by configuring the heap memory for Direct Memory Access (DMA) operations that I in the art in possession of the present disclosure will appreciate may allow hardware subsystems to access that portion of the heap memory independently from the processing system (e.g., a CPU) that provides the operating system engine 204a. As discussed below, the configuration of the heap memory for DMA operations may be performed in embodiments in which the logical storage device provided by the software RAID engine 204a using the storage devices 208b and 210 includes a RAID level that requires the calculation of parity data, although I in the art in possession of the present disclosure will appreciate how other reasons and/or uses of DMA operations via the heap memory will fall within the scope of the present disclosure as well.

In an embodiment, the configuration of the memory space for the direct-attached storage device software RAID crash dump system at block 1102 may include storing, in that memory space, identifiers for any of the controller devices 208a and/or 210a that couple the software RAID engine 204a to storage devices 208b and/or 210 that provide a crash dump logical storage subsystem in the logical storage device. As will be appreciated by I in the art in possession of the present disclosure, crash dump functionality may be enabled in the computing device 200 (e.g., by default by a manufacturer of the computing device 200, by a user of the computing device 200, etc.) by designating a "crash dump" logical storage subsystem in the logical storage device provided by the storage devices 208b and/or 210 (e.g., a minimum of two storage devices may be designated for any RAID logical storage subsystem including the crash dump logical storage subsystem), and that crash dump logical storage subsystem may be identified in the memory space for the direct-attached storage device software RAID crash dump system (e.g., the crash dump heap memory discussed above). To provide a specific example, crash dump functionality may be enabled via the hypervisor engine 204b (e.g., the VMWARE® ESXi hypervisor discussed above) in the operating system engine 204 of the computing device 200 by default on the "boot drive partition number 7" in the logical storage device provided by the storage devices 208b and/or 210, but may be modified by a user such that it is provided on any other crash dump logical storage subsystem in the logical storage device while remaining within the scope of the present disclosure as well.

As such, identifiers may be stored in the memory space for the direct-attached storage device software RAID crash dump system (e.g., the crash dump heap memory discussed above) at block 1102 for any of the controller device(s) 208a that are coupled to the storage devices 208b that provide a crash dump logical storage subsystem, and/or for any the controller device(s) 210a included in the storage devices 210 that provide a crash dump logical storage subsystem. As will be appreciated by I in the art in possession of the present disclosure, the identifiers for the controller device(s) 208a and/or 210a coupled to the storage devices 208b and/or 210 that provide a crash dump logical storage subsystem may be utilized during the crash dump operations discussed below to ensure that the software RAID engine 204a can access any secondary controller device(s) (e.g., controller devices other than the primary controller device) coupled to the storage devices 208b and/or 210 that provide a crash dump logical storage subsystem (e.g., while any identifier for the primary controller device may not be needed due to the software RAID engine 204a already having access to the primary controller device by default). Furthermore, while not described in detail, I in the art in possession of the present disclosure will appreciate how the memory space for the direct-attached storage device software RAID crash dump system may also be utilized during the crash dump operations discussed below to transmit communications (e.g., RAID internal I/O commands, etc.) between the software RAID engine 204a and the controller devices 208a and 210a during those crash dump operations, as well as to perform any other functionality that would be apparent to I in the art in possession of the present disclosure.

Figure 12:
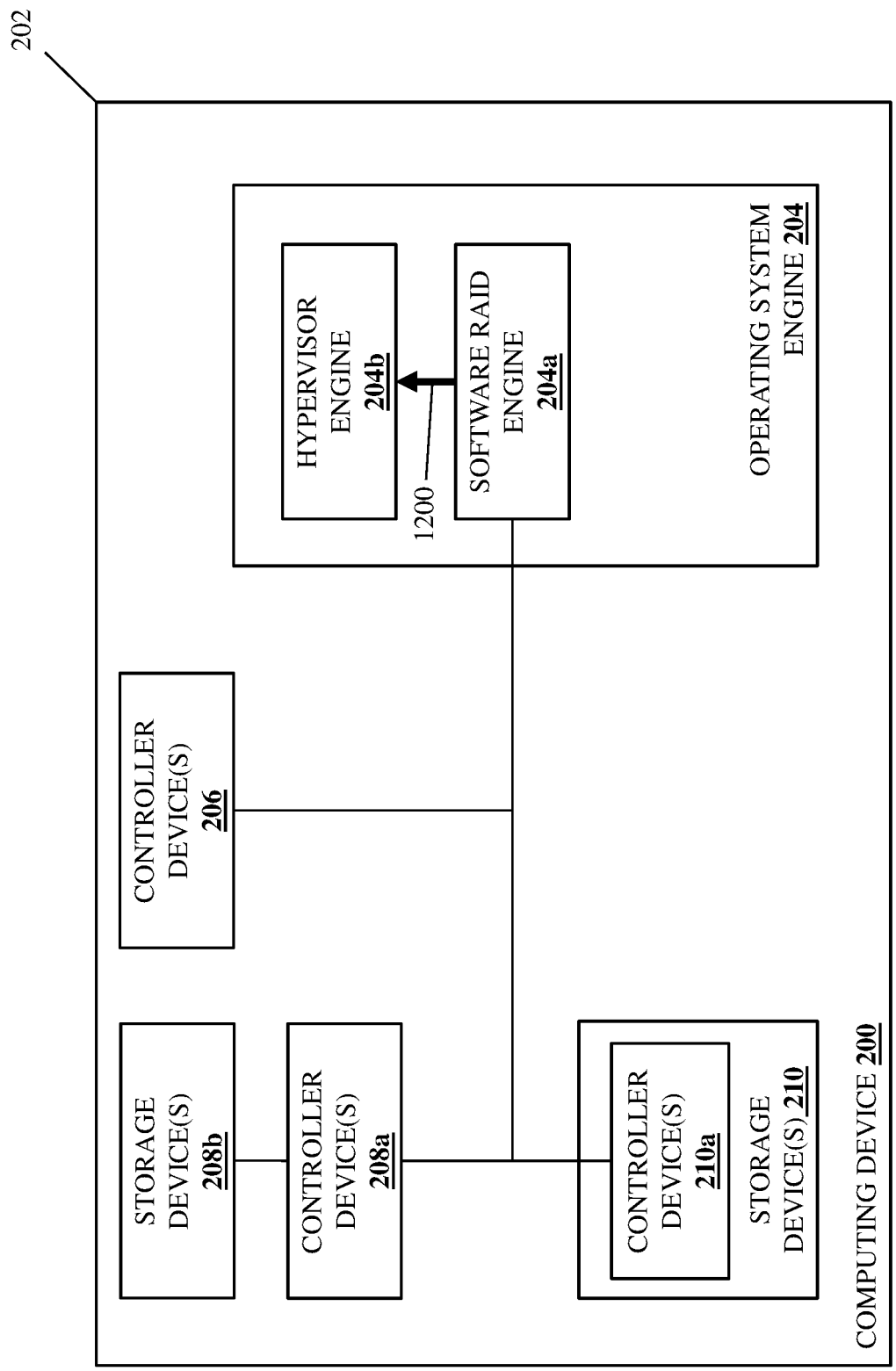
FIG. 12 is a schematic view illustrating an embodiment of the operation of the computing device of FIG. 2 during the method of FIGS. 11A and 11B.

The method 1100 then proceeds to block 1104 where the software RAID registers crash dump commands with the hypervisor subsystem. As will be appreciated by one of, block 1104 of the method 1100 may be provided during the "normal" or "runtime" mode for the computing device 200 discussed above and prior to the system crash described below. With reference to FIG. 12, in an embodiment of block 1104, the software RAID engine 204a in the computing device 200 may perform crash dump command registration operations 1200 that include registering any crash dump commands with the hypervisor engine 204b in the computing device 200 that will be utilized during the crash dump operations discussed below. Continuing with the specific example above in which the hypervisor engine 204b is provided by the VMWARE® ESXi hypervisor discussed above, at block 1104 the software RAID engine 204a may register a "dumpCommand" ESXi call with the hypervisor engine 204b that is configured to provide a submission entry point for any Input/Output (I/O) crash dump commands that will be provided by the hypervisor engine 204b to the software RAID engine 204a during crash dump operations, as well as register a "dumpPollHandler" ESXi call with the hypervisor engine 204b that is configured to provide for the polling of the completion of I/O crash dump commands by the hypervisor engine 204b with the software RAID engine 204a during crash dump operations.

As will be appreciated by one of skill in the art in possession of the present disclosure, the registration of crash dump commands like those discussed above during the normal or runtime mode for the computing device 200 configures the hypervisor engine 204b in the computing device 200 to communicate with the software RAID engine 204a in the computing device 200 in the event of a crash like the system crash described below. However, while specific examples of the registration of crash dump commands with the hypervisor subsystem has been described, one of skill in the art in possession of the present disclosure in the art in possession of the present disclosure will appreciate how the crash dump communications and/or other operations discussed below may be enabled in a variety of manners that will fall within the scope of the present disclosure as well.

The method 1100 then proceeds to block 1106 where a system crash occurs. As will be appreciated by one of skill in the art in possession of the present disclosure, the computing device 200 may experience a "crash", system fault, unavailability, or other issue with the computing device 200 that can render the computing device 200 unavailable (e.g., while providing a "crash screen" on a display connected to the computing device 200 that is often referred to as "pink screen of death"). In response to such a system crash, the hypervisor engine 204b may be configured to initiate a crash dump and generate any of a variety of Operating System (OS)-level crash dump commands (e.g., any of the crash dump commands registered with the hypervisor engine 204b at block 1104 as discussed above) that are configured to instruct performance of the crash dump described below. However, while a specific system crash and subsequent operations of the hypervisor engine 204b have been described, one of skill in the art in possession of the present disclosure will appreciate how any of a variety of crash dump scenarios will fall within the scope of the present disclosure as well.

The method 1100 then proceeds to block 1107 where the software RAID subsystem receives a first/OS-level crash dump command from the hypervisor subsystem. As discussed above, in response to the system crash occurring at block 1106, the hypervisor engine 204b in the computing device 200 may generate OS-level crash dump commands (also referred to as "first" crash dump commands), and thus at block 1007 the software RAID engine 204a in the computing device 200 may receive the OS-level crash dump commands from the hypervisor engine 204b in the computing device 200.

Figure 13:
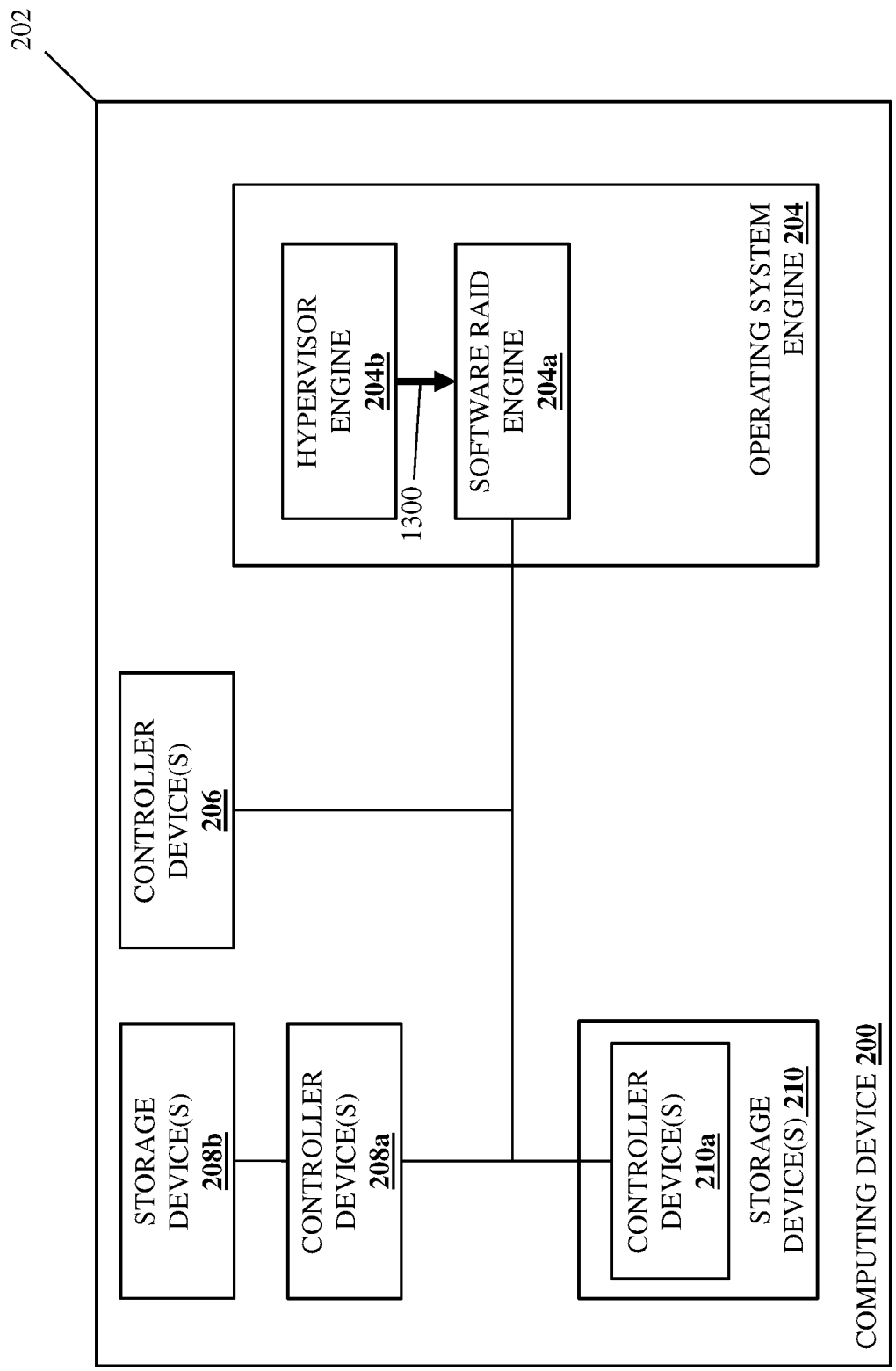
FIG. 13 is a schematic view illustrating an embodiment of the operation of the computing device of FIG. 2 during the method of FIGS. 11A and 11B.

The method 1100 may then proceed to block 1108 where the software RAID subsystem identifies a subset of physical storage devices that provide a crash dump logical storage subsystem identified in the OS-level crash dump command. With reference to FIG. 13, in an embodiment of block 1107 and in response to the "crash", system fault, unavailability, or other issue with the computing device 200, the hypervisor engine 204b in the computing device 200 may automatically generate crash dump information related to the system issue that initiated the crash dump (e.g., the processes, drivers, programs, applications, and/or other components running or otherwise operating at the time of the system issue, the Kernel-mode stack that "stopped" or otherwise became unavailable, etc.), and may then generate an OS-level crash dump command (e.g., including the "dumpCommand" ESXi call discussed above) that is includes that crash dump information, that is directed to the primary controller device, and that identifies the crash dump logical storage subsystem in the logical storage device.

As will be appreciated by one of skill in the art in possession of the present disclosure and as discussed in further detail below, in response to the system crash at block 1106, the computing device 200 may exit the normal or runtime mode discussed above and enter a "crash dump" mode in which the OS-level crash dump commands are sent directly from the hypervisor engine 204b to the software RAID engine 204a using crash dump command callbacks registered at block 1104, with the software RAID engine 204a then passing those OS-level crash dump commands to the storage devices as the second/RAID-level crash dump commands described below that depend on the RAID level implemented in the RAID provided by the storage devices 208b and 210.

As such, the receipt of the OS-level crash dump command by the software RAID engine 204a from the hypervisor engine 204b may initiate crash dump operations by the software RAID engine 204a, and in response the software RAID engine 204a may prevent rebuild operations and/or recovery operations associated with the logical storage device provided by the storage devices 208b and 210 by, for example, ignoring rebuild I/O commands and/or recovery I/O commands that may be generated during the crash dump operations.

In an embodiment, at block 1108 and in response to receiving the OS-level crash dump command from the hypervisor engine 204b in the computing device 200, the software RAID engine 204a in the computing device 200 may use the crash dump logical storage subsystem identified in that OS-level crash dump command to identify the storage devices that provide that crash dump logical storage subsystem and/or the controller devices that couples those storage devices to the software RAID engine 204a. For example, during the normal or runtime mode of the computing device 200 (e.g., prior to the crash dump operations and/or receipt of the OS-level crash dump command), the software RAID engine 204a may access the crash dump heap memory discussed above and determine which of the storage devices 208b and/or 210 are identified as providing the crash dump logical storage subsystem, and/or the controller devices 208a and/or 210a that couple those storage devices 208b and/or 210 to the software RAID engine 204a. Subsequently, at block 1108 and in response to receiving the OS-level crash dump command at block 1107, the software RAID engine 204a may determine that those storage devices provide the crash dump logical storage subsystem that is identified in the OS-level crash dump command that was received at block 1107, and/or may identify the controller devices that couple those storage devices to the software RAID engine 204a.

As such, in embodiments in which the storage devices 208b and/or 210 that provide the crash dump logical storage subsystem are coupled to multiple controller devices 208a and/or 210a (i.e., the crash dump logical storage subsystem is "spanned" on multiple controller devices), each of those controller devices 208a and/or 210a will be identified at block 1108. As discussed above, the software RAID engine 204a may already have default access to the controller device that is presented to the hypervisor engine 204b as the primary controller device connected to the logical storage device, while access to any secondary controller devices may be enabled via the identification of those secondary controller devices at block 1108 in the crash dump heap memory. For example, in response to identifying each of the controller devices that couple software RAID engine 204*a* to the storage devices that provide the crash dump logical storage subsystem, the software RAID engine 204*a* may determine whether any of those controller devices that are inaccessible (e.g., which may include any secondary controller devices that couple the software RAID engine 204*a* to the storage devices that provide the crash dump logical storage subsystem) and, in response, may initialize those controller devices so that they become accessible to the software RAID engine 204*a*. As such, in situations in which storage devices that provide the crash dump logical storage subsystem are coupled to the software RAID engine 204*a* via secondary controller devices, the identification and initialization of those secondary controller devices at block 1108 will ensure that the software RAID engine 204*a* can access those secondary controller devices for crash dump operations.

The method 1100 then proceeds to block 1110 where the software RAID subsystem transmits second/RAID-level crash dump commands to the subset of physical storage devices that provide the crash dump logical storage subsystem via one or more respective controller devices that couple the software RAID subsystem to that subset of physical storage devices. In an embodiment, at block 1110, the software RAID engine 204*a* in the computing device 200 may generate RAID-level crash dump commands (also referred to below as "second" crash dump commands) for each of the storage devices that were identified at block 1108 as providing the crash dump logical storage subsystem in the logical storage device. For example, for any particular OS-level crash dump command that was directed to the primary controller device by the hypervisor engine 204*b* in the computing device 200 and that identified the crash dump logical storage subsystem, the software RAID engine 204*a* may generate a respective RAID-level crash dump command for each of the storage devices that provide the crash dump logical storage subsystem (i.e., a plurality of separate RAID-level crash dump I/O commands may be generated based on a single OS-level crash dump I/O command received from the hypervisor engine 204*b*).

In some embodiments, the RAID-level crash dump commands may split the OS-level crash dump commands depending on the RAID level implemented on the RAID provided by the storage devices 208*b* and 210. To provide a specific example, the OS-level crash dump command may be provided by a SCSI-based crash dump command that is submitted via the dump command callback described above, and the RAID-level crash dump commands may be provided by sub-commands that are generated from the OS-level crash dump command based on the number of storage devices providing the crash dump logical storage subsystem, as well as translated to the specific protocol(s) of the storage devices 208*b* and 210 to which they will be transmitted if necessary.

Figure 14:
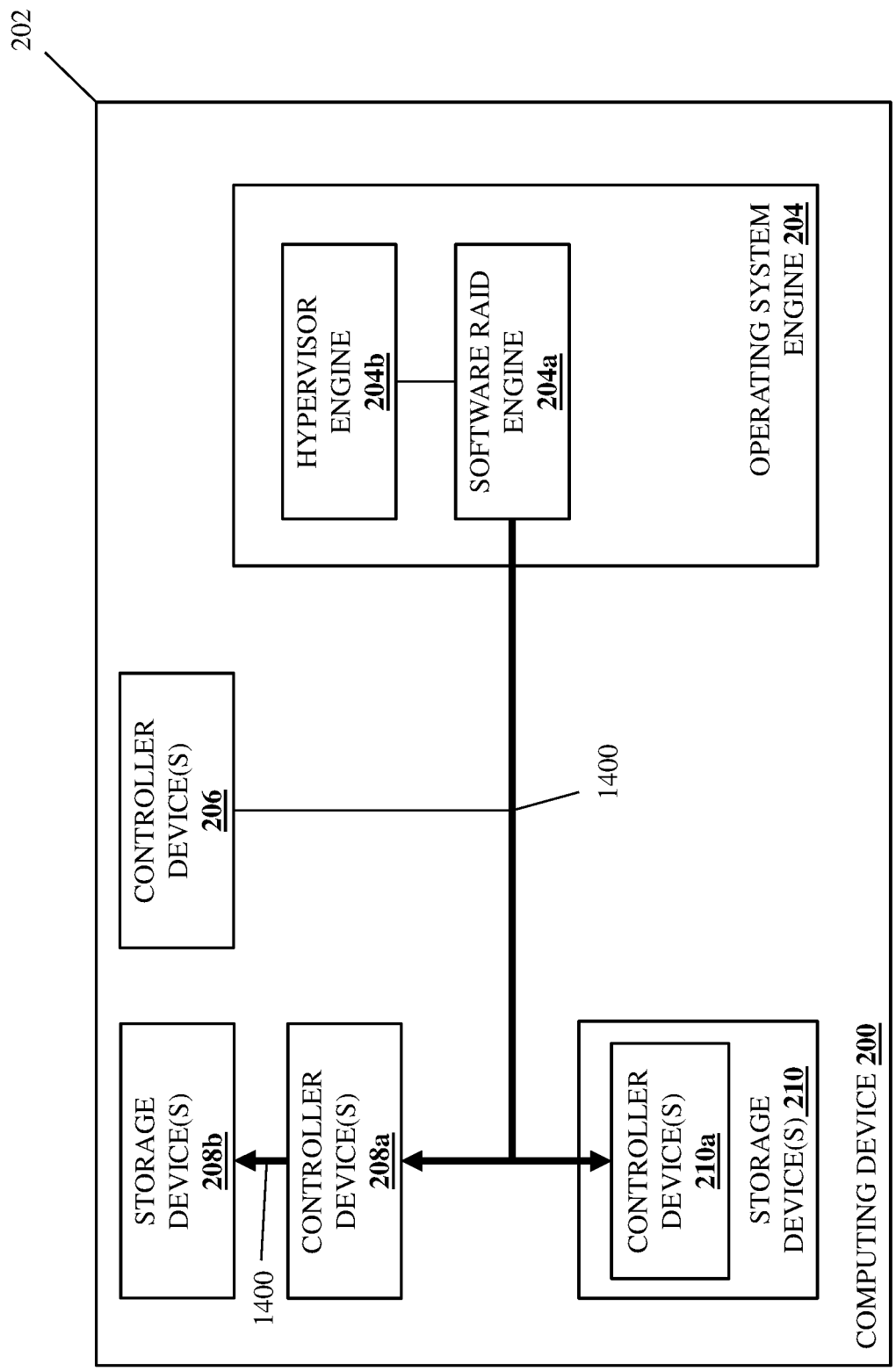
FIG. 14 is a schematic view illustrating an embodiment of the operation of the computing device of FIG. 2 during the method of FIGS. 11A and 11B.

With reference to FIG. 14, in an embodiment of block 1110, the software RAID engine 204*a* in the computing device 200 may then perform crash dump command transmission operations 1400 that may include transmitting the RAID-level crash dump commands generated at block 1110 to each of the storage devices 208*b* and/or 210 that provide the crash dump logical storage subsystem via the controller devices 208*a* and/or 210*a* that couple those storage devices 208*b* and/or 210 to the software RAID engine 204*a*. To provide a specific example, the RAID-level crash dump commands may be transmitted by the software RAID engine 204*a* to the storage devices 208*b* and/or 210 that provide the crash dump logical storage subsystem by submitting those RAID-level crash dump commands into submission queues in the controller devices 208*a* and/or 210*a* that couple those storage devices 208*b* and/or 210 to the software RAID engine 204*a*, although other techniques for providing the RAID-level crash dump commands to those storage devices are envisioned as falling within the scope of the present disclosure as well.

As will be appreciated by one of skill in the art in possession of the present disclosure, the transmission of the RAID-level crash dump commands to each of the storage devices 208*b* and/or 210 that provide the crash dump logical storage subsystem via the controller devices 208*a* and/or 210*a* that couple those storage devices 208*b* and/or 210 to the software RAID engine 204*a* will result in the initiation of the performance of crash dump operations by those storage devices/controller devices, which one of skill in the art in possession of the present disclosure will recognize may include storing any of the crash dump information that was generated by the hypervisor engine 204*b* in the computing device 200 and received in the OS-level crash dump command. Furthermore, in embodiments in which the logical storage device provides a RAID level that requires parity calculations, the crash dump operations may include the utilization of the portion of the heap memory reserved for DMA operations in order to perform those parity calculations.

Figure 15A:
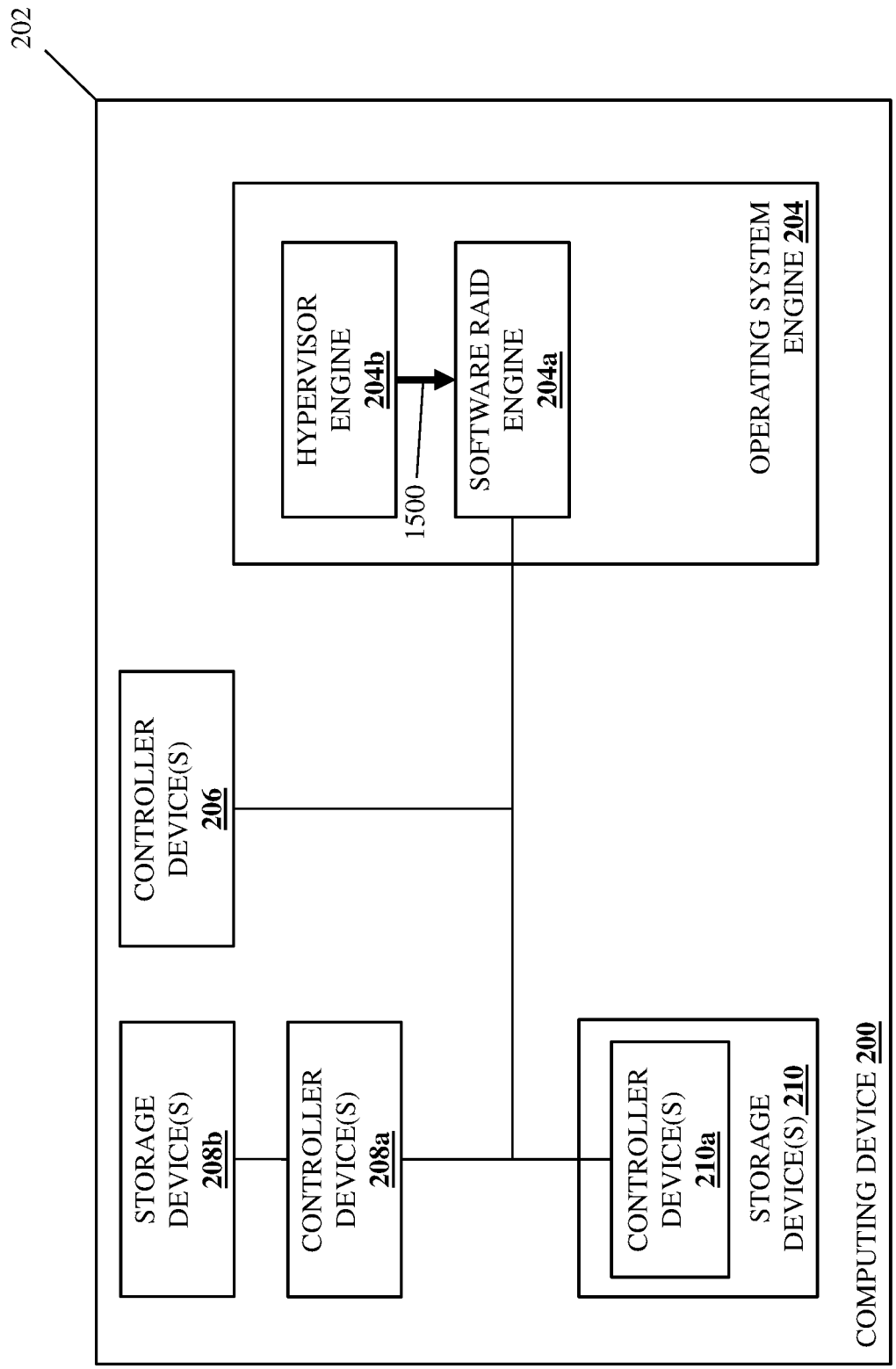
FIG. 15A is a schematic view illustrating an embodiment of the operation of the computing device of FIG. 2 during the method of FIGS. 11A and 11B.

The method 1100 then proceeds to block 1112 where the software RAID subsystem polls completion queues in the one or more respective controller devices that couple the software RAID subsystem to the subset of the physical storage devices that provides the crash dump logical storage subsystem. With reference to FIG. 15A, in an embodiment of block 1112, the hypervisor engine 204*b* in the computing device 200 may perform crash dump status request operations 1500 that may include providing a crash dump status request to the software RAID engine 204*a* in the computing device 200. For example, following its provisioning of the OS-level crash dump command at block 1106, the hypervisor engine 204*b* may generate a crash dump status request (e.g., including the "dumpPollHandler" ESXi call discussed above) that is directed to the primary controller device and that identifies the OS-level crash dump command. In an embodiment, the crash dump status requests may be sent directly from the hypervisor engine 204*b* to the software RAID engine 204*a* using crash dump command callbacks registered at block 1104, with the software RAID engine 204*a* then passing those crash dump status requests to the storage devices.

Furthermore, as discussed in further detail below, the hypervisor engine 204*b* may submit the "dumpCommand" ESXi call discussed above followed by the "dumpPollHandler" ESXi call, and until it receives a crash dump command completion confirmation in response to the "dumpPollHandler" ESXi call, it will not submit the next "dumpCommand" ESXi call as part of the crash dump (e.g., because its single threaded). Furthermore, the software RAID engine 204*a* will respond directly to the hypervisor engine 204*b* after receiving the "dumpPollHandler" ESXi call with a confirmation if the "dumpCommand" ESXi call has been completed, and if multiple storage devices provide the crash dump logical storage subsystem, the software RAID engine 204*a* will wait until each RAID-level crash dump sub-command provided to those storage devices has been completed before sending that confirmation to the hypervisor engine 204b.

Figure 15B:
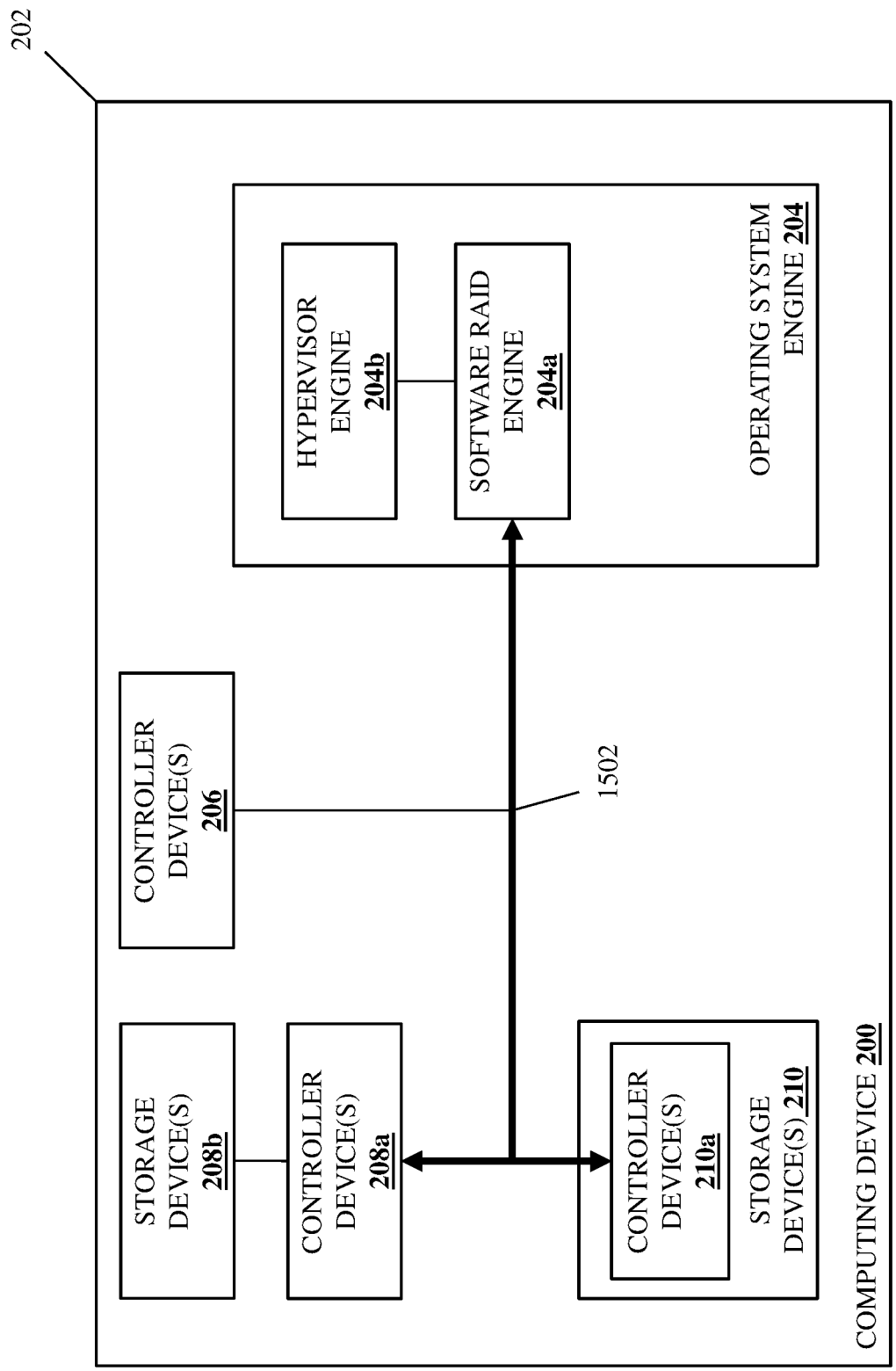
FIG. 15B is a schematic view illustrating an embodiment of the operation of the computing device of FIG. 2 during the method of FIGS. 11A and 11B.

With reference to FIG. 15B, in an embodiment and in response to receiving the crash dump status request from the hypervisor engine 204b in the computing device 200, the software RAID engine 204a in the computing device 200 may perform completion queue polling operations 1502 that may include polling completion queues in each of the controller devices 208a and/or 210a that couple the software RAID engine 204a to the storage devices 208a and/or 210 that provide the crash dump logical storage subsystem, and determining whether the RAID-level crash dump command submitted to that storage device/controller device has been completed. However, while the polling of completion queues has been described as being performed to determine whether RAID-level crash dump commands provided to storage devices that provide the logical storage subsystem have been completed, other techniques for determining whether RAID-level crash dump commands provided to storage devices that provide the logical storage subsystem have been completed (e.g., storage devices/controller devices issuing crash dump interrupts to the software RAID engine 204A) are envisioned as falling within the scope of the present disclosure as well.

The method 1100 then proceeds to decision block 1114 where it is determined whether the RAID-level crash dump commands have been completed. In an embodiment, at decision block 1114 and based on the completion queue polling operations 1502 performed at block 1112, the software RAID engine 204a in the computing device 200 may determine whether the RAID-level crash dump commands provided to storage devices that provide the crash dump logical storage subsystem have been completed. As discussed below, decision block 1114 may be performed to ensure that the RAID-level crash dump command provided to each storage device that provides the crash dump logical storage subsystem is indicated as having been completed in the completion queue of the controller device that couples that storage device to the software RAID engine 204a prior to confirming the completion of the crash dump operations with the hypervisor engine 204b in the computing device 200. However, as discussed above, the storage devices that provide the crash dump logical storage subsystem (or their connected controller devices) may instead utilize crash dump interrupts to report their completion of RAID-level crash dump commands to the software RAID engine 204a while remaining within the scope of the present disclosure as well.

If, at decision block 1114, it is determined that the RAID-level crash dump commands have not been completed, the method 1100 returns to block 1112. As such, the method 1100 may loop such that the software RAID engine 204a in the computing device 200 continues to poll the completion queues in the controller devices 208a and/or 210a that couple the software RAID engine 204a to the storage devices 208b and/or 210 that provide the crash dump logical storage subsystem until it determines that each of the RAID-level crash dump commands that were provided to those storage devices/controller devices have been completed.

Figure 15C:
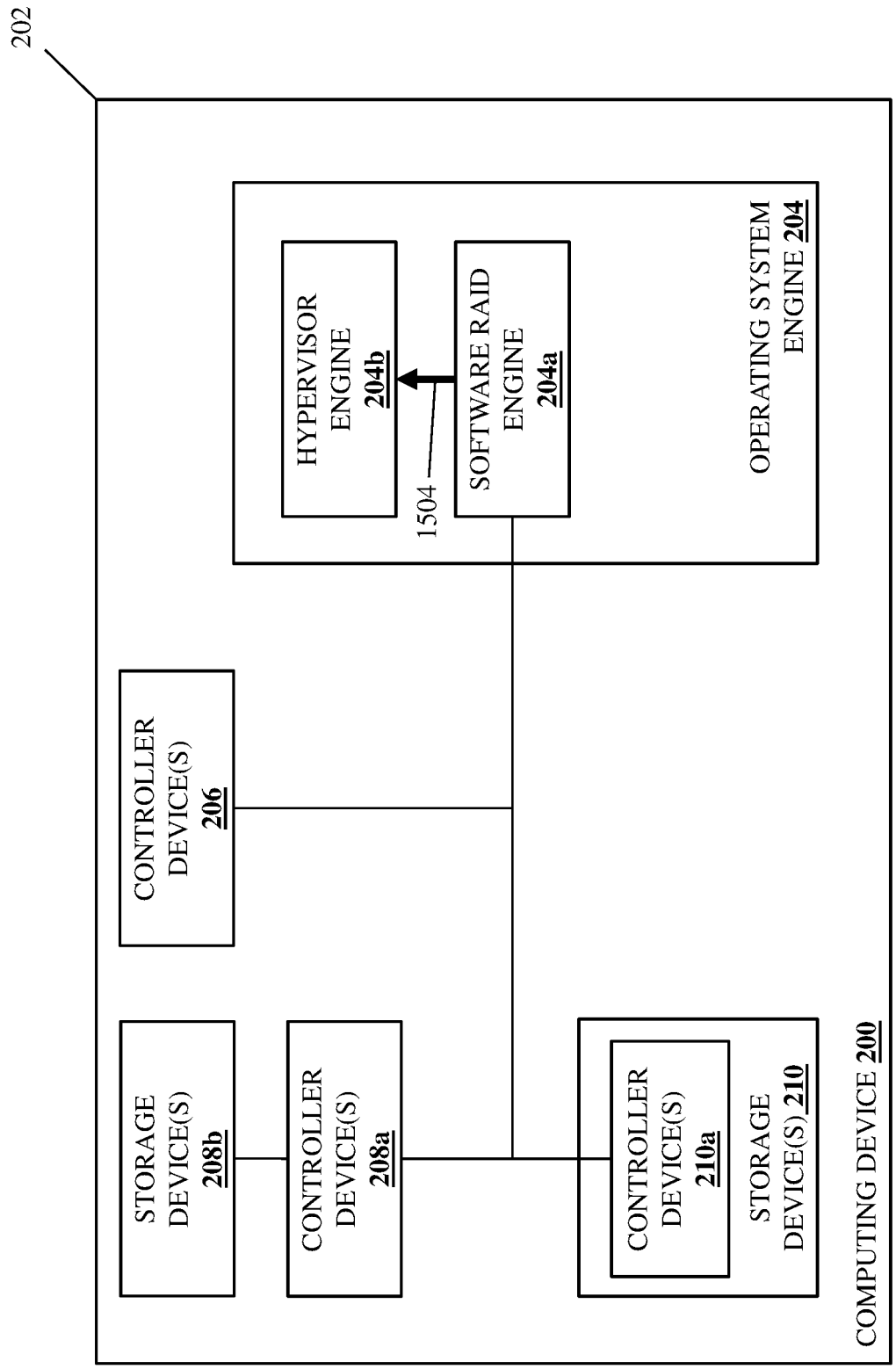
FIG. 15C is a schematic view illustrating an embodiment of the operation of the computing device of FIG. 2 during the method of FIGS. 11A and 11B.

If, at decision block 1114, it is determined that the RAID-level crash dump commands have been completed, the method 1100 proceeds to block 1116 where the software RAID subsystem transmits a crash dump confirmation to the hypervisor subsystem. With reference to FIG. 15C, in an embodiment of block 1116 and in response to determining that each of the RAID-level crash dump commands that were provided to the storage devices 208b and/or 210 that provide the crash dump logical storage subsystem have been completed, the software RAID engine 204a in the computing device 200 may perform crash dump confirmation transmission operations 1504 that may include transmitting a crash dump confirmation (e.g., a confirmation for the "dumpPollHandler" ESXi call discussed above) to the hypervisor engine 204b in the computing device 200 that indicates that the OS-level crash dump command provided by the hypervisor engine 204b at block 1107 has been completed.

The method 1100 then proceeds to decision block 1118 where the method 1100 proceeds depending on whether the crash dump has been completed. As will be appreciated by one of skill in the art in possession of the present disclosure, a crash dump may involve the hypervisor engine 204b in the computing device 200 issuing a plurality of the OS-level crash dump commands described above. As such, in the event the crash dump has not been completed at decision block 1118, the method 1100 may return to block 1107. As such, the method 1100 may loop such that any OS-level crash dump command received by the software RAID engine 204a in the computing device 200 from the hypervisor engine 204b in the computing device 200 at block 1107 is provided to the storage devices that provide the crash dump logical storage subsystem using the RAID-level crash dump commands described above, with the completion of that RAID-level crash dump command by each of those storage devices confirmed so that a crash dump confirmation may then be provided by the hypervisor engine 204b for that OS-level crash dump command. Furthermore, when the crash dump is completed at decision block 1118, the method 1100 may proceed to block 1120 where the computing device restarts.

Thus, systems and methods have been described that provide for the presentation by a software RAID subsystem to a hypervisor subsystem of a single, primary controller device as being connected to a logical storage device provided by a plurality of physical storage devices, with the software RAID subsystem receiving crash dump commands from the hypervisor subsystem that are directed to the primary controller device and that identify a crash dump logical storage subsystem that is included in the logical storage device, and transmitting a respective second crash dump command to each of a subset of the plurality of physical storage devices that provide the crash dump logical storage subsystem via a respective one of the plurality of controller devices that couples the software RAID subsystem to that physical storage device, confirming completion of the respective second crash dump commands and, in response, transmitting a crash dump confirmation to the hypervisor subsystem. As such, crash dump operations are enabled using any logical storage subsystems (e.g., RAID LUNs or other RAID volumes) in a logical storage device regardless of whether that logical storage subsystem is "spanned" (e.g., provided using physical storage devices connected to two or more controller devices) or "non-spanned" (e.g., provided using physical storage devices connected to the same controller device)

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A direct-attached storage device software Redundant Array of Independent Disk (RAID) crash dump system, comprising:
a chassis;
a plurality of physical storage devices that are housed in the chassis;
a plurality of controller devices that are housed in the chassis;
a hypervisor subsystem that is housed in the chassis; and
a software Redundant Array of Independent Disk (RAID) subsystem that is housed in the chassis, and that is coupled to each of the plurality of physical storage devices, to each of the plurality of controller devices, and to the hypervisor subsystem, wherein the software RAID subsystem is configured to:
present, to the hypervisor subsystem, a first controller device included in the plurality of controller devices as a primary controller device that is connected to a logical storage device provided by the plurality of physical storage devices;
receive, from the hypervisor subsystem, a first crash dump command that is directed to the primary controller device and that identifies a crash dump logical storage subsystem in the logical storage device;
transmit, to each of a subset of the plurality of physical storage devices that provide the crash dump logical storage subsystem, a respective second crash dump command via a respective one of the plurality of controller devices that couples the software RAID subsystem to that physical storage device; and
confirm, with each of the subset of the plurality of physical storage devices that provide the crash dump logical storage subsystem, completion of the respective second crash dump command via the respective one of the plurality of controller devices that couples the software RAID subsystem to that physical storage device and, in response, transmit a crash dump confirmation to the hypervisor subsystem.

2. The system of claim 1, wherein the confirming the completion of the respective second crash dump command with each of the subset of the plurality of physical storage devices that provide the crash dump logical storage subsystem via the respective one of the plurality of controller devices that couples the software RAID subsystem to that physical storage device includes:
receiving, from the hypervisor subsystem, a polling request that is directed to the primary controller device; and
polling crash dump command completion queues in each of the respective ones of the plurality of controller devices that couple the software RAID subsystem to the subset of the plurality of physical storage devices that provide the crash dump logical storage subsystem.

3. The system of claim 1, wherein the software RAID subsystem is configured to:
prevent, subsequent to receiving the first crash dump command from the hypervisor subsystem and prior to transmitting the crash dump confirmation to the hypervisor subsystem, data rebuild and data recovery operations associated with the logical storage device.

4. The system of claim 1, wherein the software RAID subsystem is configured to:
reserve, in a memory system included in a chassis, a Direct Memory Access (DMA) memory subsystem; and
use the DMA memory subsystem reserved in the memory system to perform parity calculations required to complete the respective second crash dump commands.

5. The system of claim 1, wherein the plurality of controller devices include second controller devices that each couple the software RAID subsystem to at least one of the plurality of storage devices, and wherein the software RAID subsystem is configured to:
present, to the hypervisor subsystem, each of the second controller devices as a secondary controller device that is not coupled to any of the plurality of storage devices.

6. The system of claim 1, wherein the respective ones of the plurality of controller devices that couple the software RAID subsystem to each of the subset of the plurality of physical storage devices that provide the crash dump logical storage subsystem do not include the primary controller device.

7. An Information Handling System (IHS), comprising:
a processing system; and
a memory system that is coupled to the processing system and that includes instructions that, when executed by the processing system, cause the processing system to provide a software Redundant Array of Independent Disk (RAID) engine that is configured to:
present, to a hypervisor subsystem, a first controller device included in a plurality of controller devices as a primary controller device that is connected to a logical storage device provided by a plurality of physical storage devices;
receive, from the hypervisor subsystem, a first crash dump command that is directed to the primary controller device and that identifies a crash dump logical storage subsystem in the logical storage device;
transmit, to each of a subset of the plurality of physical storage devices that provide the crash dump logical storage subsystem, a respective second crash dump command via a respective one of the plurality of controller devices that couples the processing system to that physical storage device; and
confirm, with each of the subset of the plurality of physical storage devices that provide the crash dump logical storage subsystem, completion of the respective second crash dump command via the respective one of the plurality of controller devices that couples the processing system to that physical storage device and, in response, transmit a crash dump confirmation to the hypervisor subsystem.

8. The IHS of claim 7, wherein the confirming the completion of the respective second crash dump command with each of the subset of the plurality of physical storage devices that provide the crash dump logical storage subsystem via the respective one of the plurality of controller devices that couples the processing system to that physical storage device includes:
receiving, from the hypervisor subsystem, a polling request that is directed to the primary controller device; and
polling crash dump command completion queues in each of the respective ones of the plurality of controller devices that couple the processing system to the subset of the plurality of physical storage devices that provide the crash dump logical storage subsystem.

9. The IHS of claim 7, wherein the software RAID engine is configured to:
prevent, subsequent to receiving the first crash dump command from the hypervisor subsystem and prior to transmitting the crash dump confirmation to the hypervisor subsystem, data rebuild and data recovery operations associated with the logical storage device.

10. The IHS of claim 7, wherein the software RAID subsystem is configured to:
reserve, in the memory system, a Direct Memory Access (DMA) memory subsystem; and
use the DMA memory subsystem reserved in the memory system to perform parity calculations required to complete the respective second crash dump commands.

11. The IHS of claim 7, wherein the plurality of controller devices include second controller devices that each couple the processing system to at least one of the plurality of storage devices, and wherein the software RAID engine is configured to:
present, to the hypervisor subsystem, each of the second controller devices as a secondary controller device that is not coupled to any of the plurality of storage devices.

12. The IHS of claim 7, wherein the respective ones of the plurality of controller devices that couple the processing system to each of the subset of the plurality of physical storage devices that provide the crash dump logical storage subsystem do not include the primary controller device.

13. The IHS of claim 7, wherein only the primary controller device couples the processing system to each of the subset of the plurality of physical storage devices that provide the crash dump logical storage subsystem.

14. A method for providing crash dumps in a software Redundant Array of Independent Disk (RAID) using direct-attached storage devices in a computing device, comprising:
presenting, by a software Redundant Array of Independent Disk (RAID) subsystem to a hypervisor subsystem, a first controller device included in a plurality of controller devices as a primary controller device that is connected to a logical storage device provided by a plurality of physical storage devices;
receiving, by the software RAID subsystem from the hypervisor subsystem, a first crash dump command that is directed to the primary controller device and that identifies a crash dump logical storage subsystem in the logical storage device;
transmitting, by the software RAID subsystem to each of a subset of the plurality of physical storage devices that provide the crash dump logical storage subsystem, a respective second crash dump command via a respective one of the plurality of controller devices that couples the software RAID subsystem to that physical storage device; and
confirming, by the software RAID subsystem with each of the subset of the plurality of physical storage devices that provide the crash dump logical storage subsystem, completion of the respective second crash dump command via the respective one of the plurality of controller devices that couples the software RAID subsystem to that physical storage device and, in response, transmit a crash dump confirmation to the hypervisor subsystem.

15. The method of claim 14, wherein the confirming the completion of the respective second crash dump command with each of the subset of the plurality of physical storage devices that provide the crash dump logical storage subsystem via the respective one of the plurality of controller devices that couples the software RAID subsystem to that physical storage device includes:
receiving, by the software RAID subsystem from the hypervisor subsystem, a polling request that is directed to the primary controller device; and
polling, by the software RAID subsystem, crash dump command completion queues in each of the respective ones of the plurality of controller devices that couple the software RAID subsystem to the subset of the plurality of physical storage devices that provide the crash dump logical storage subsystem.

16. The method of claim 15, further comprising:
preventing, by the software RAID subsystem subsequent to receiving the first crash dump command from the hypervisor subsystem and prior to transmitting the crash dump confirmation to the hypervisor subsystem, data rebuild and data recovery operations associated with the logical storage device.

17. The method of claim 14, further comprising:
reserving, by the software RAID subsystem in a memory system included in a chassis, a Direct Memory Access (DMA) memory subsystem; and
using, by the software RAID subsystem, the DMA memory subsystem reserved in the memory system to perform parity calculations required to complete the respective second crash dump commands.

18. The method of claim 14, wherein the plurality of controller devices include second controller devices that each couple the software RAID subsystem to at least one of the plurality of storage devices, and wherein the method further comprises:
presenting, by the software RAID subsystem to the hypervisor subsystem, each of the second controller devices as a secondary controller device that is not coupled to any of the plurality of storage devices.

19. The method of claim 14, wherein the respective ones of the plurality of controller devices that couple the software RAID subsystem to each of the subset of the plurality of physical storage devices that provide the crash dump logical storage subsystem do not include the primary controller device.

20. The method of claim 14, wherein only the primary controller device couples the processing system to each of the subset of the plurality of physical storage devices that provide the crash dump logical storage subsystem.

* * * * *